US012572008B2

(12) United States Patent
Shinkawa et al.

(10) Patent No.: US 12,572,008 B2
(45) Date of Patent: Mar. 10, 2026

(54) MOVABLE DEVICE, PROJECTION APPARATUS, HEAD-UP DISPLAY, LASER HEADLAMP, HEAD-MOUNTED DISPLAY, AND OBJECT RECOGNITION APPARATUS

(71) Applicants: Mizuki Shinkawa, Kanagawa (JP); Yohsuke Abe, Tokyo (JP)

(72) Inventors: Mizuki Shinkawa, Kanagawa (JP); Yohsuke Abe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 321 days.

(21) Appl. No.: 18/356,620

(22) Filed: Jul. 21, 2023

(65) Prior Publication Data

US 2024/0027746 A1      Jan. 25, 2024

(30) Foreign Application Priority Data

Jul. 25, 2022    (JP) ................................. 2022-118222
May 31, 2023    (JP) ................................. 2023-089881

(51) Int. Cl.
*G02B 26/08*          (2006.01)
*G02B 26/10*          (2006.01)

(52) U.S. Cl.
CPC ....... *G02B 26/0858* (2013.01); *G02B 26/101* (2013.01)

(58) Field of Classification Search
CPC ............ G02B 26/0841; G02B 26/0858; G02B 26/101; G02B 26/105
See application file for complete search history.

(56) References Cited

U.S. PATENT DOCUMENTS

| | | | | |
|---|---|---|---|---|
| 6,392,220 | B1 * | 5/2002 | Slater ..................... | G02B 6/327 |
| | | | | 73/514.01 |
| 2008/0054758 | A1 * | 3/2008 | Tsuboi ................... | H02N 1/008 |
| | | | | 310/309 |
| 2010/0277783 | A1 * | 11/2010 | Takahashi ............ | G02B 7/1821 |
| | | | | 359/214.1 |
| 2011/0102870 | A1 * | 5/2011 | Nakamura ........... | G02B 26/085 |
| | | | | 359/198.1 |
| 2012/0133242 | A1 | 5/2012 | Njikam Njimonzie et al. | |
| 2015/0203346 | A1 * | 7/2015 | Fujimoto .............. | B81B 3/0072 |
| | | | | 74/1 SS |
| 2018/0282147 | A1 | 10/2018 | Shinkawa et al. | |

(Continued)

FOREIGN PATENT DOCUMENTS

| | | |
|---|---|---|
| DE | 102009026507 | 12/2010 |
| EP | 2233961 | 9/2010 |

(Continued)

OTHER PUBLICATIONS

Extended European Search Report for 23187246.6 mailed on Jan. 3, 2024.

*Primary Examiner* — Nicholas R. Pasko
(74) *Attorney, Agent, or Firm* — IPUSA, PLLC

(57)          ABSTRACT

A movable device includes a supporting portion; a movable portion in the supporting portion, the movable portion movable about a first rotation axis and a second rotation axis intersecting with the first rotation axis; a member between the movable portion and the supporting portion and connected to the movable portion and the supporting portion in a connection direction. The member includes: a drive unit configured to move the movable portion; and an opening in a part of the drive unit.

19 Claims, 38 Drawing Sheets

(56) References Cited

U.S. PATENT DOCUMENTS

| | | | |
|---|---|---|---|
| 2019/0391394 A1 | 12/2019 | Shinkawa et al. | |
| 2021/0041687 A1 | 2/2021 | Yokota et al. | |
| 2021/0157129 A1 | 5/2021 | Yoda et al. | |
| 2021/0173201 A1* | 6/2021 | Ishida | G02B 26/0858 |
| 2021/0286167 A1 | 9/2021 | Shinkawa | |
| 2022/0299757 A1 | 9/2022 | Shinkawa et al. | |
| 2022/0326512 A1 | 10/2022 | Shinkawa | |
| 2023/0185081 A1* | 6/2023 | Aoshima | B81B 3/0045 |
| | | | 359/224.1 |

FOREIGN PATENT DOCUMENTS

| | | | | |
|---|---|---|---|---|
| JP | 2011-002490 | 1/2011 | | |
| WO | 2009/081858 | 7/2009 | | |
| WO | WO-2022030146 A1 * | 2/2022 | | G02B 26/101 |
| WO | WO-2024084875 A1 * | 4/2024 | | H10N 30/2041 |

* cited by examiner

COMPARATIVE EXAMPLE

FIG. 2

COMPARATIVE EXAMPLE

FIG. 3

COMPARATIVE EXAMPLE

13

110b
111b 112b

101

110c
111c 112c 112a
111a } 110a

1

111d
112d } 110d

2

Y

Z ⊙ → X

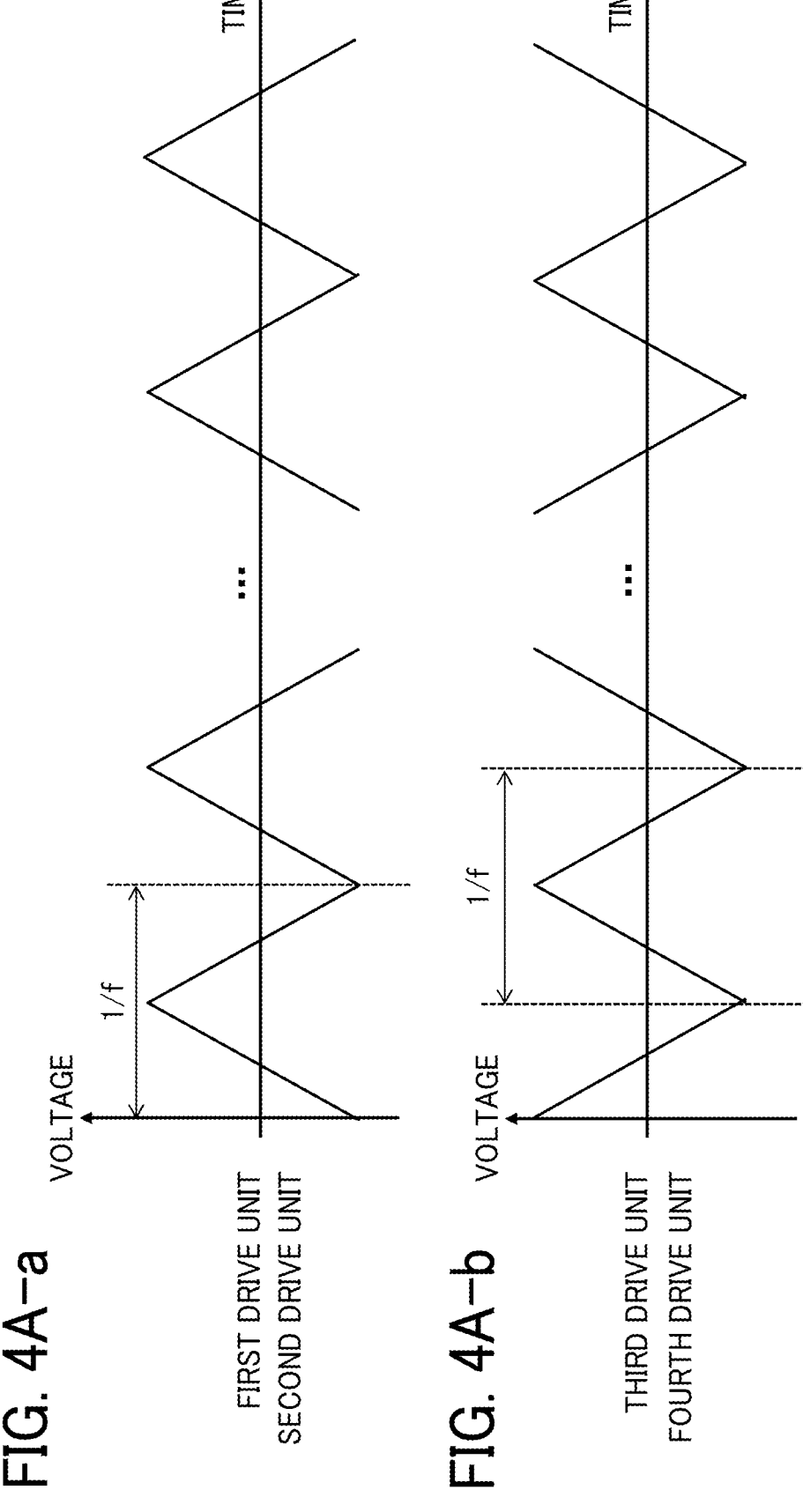
FIG. 4A-a
FIG. 4A-b

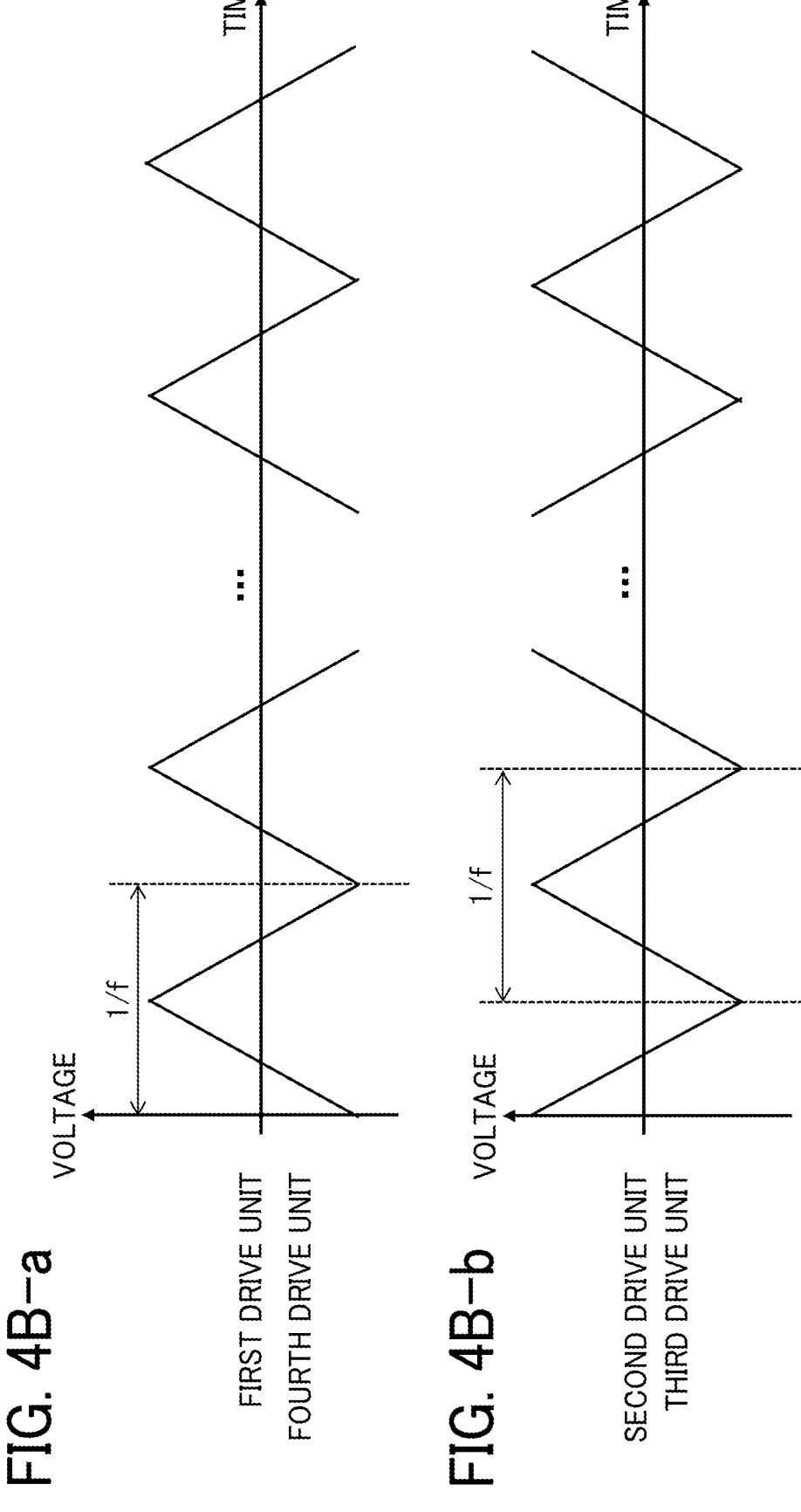
FIG. 4B-a
FIRST DRIVE UNIT
FOURTH DRIVE UNIT
FIG. 4B-b
SECOND DRIVE UNIT
THIRD DRIVE UNIT

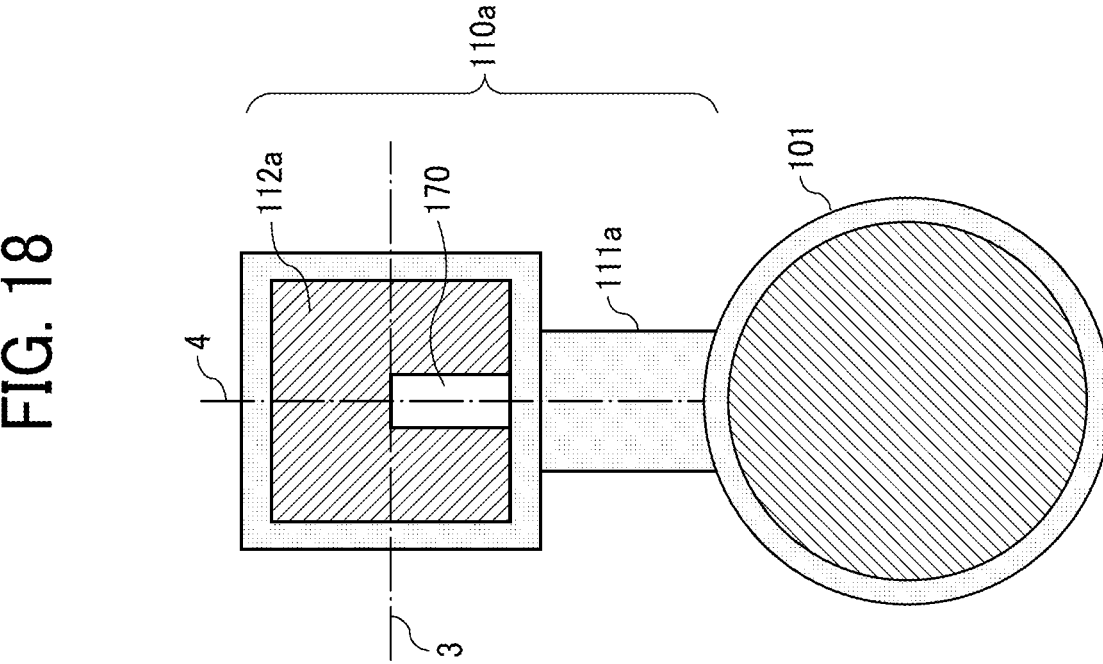

START

S11
ACQUIRE OPTICAL-SCANNING
INFORMATION

S12
GENERATE AND OUTPUT
CONTROL INSTRUCTION

S13
OUTPUT DRIVE SIGNAL

S14
OPTICAL SCANNING

END

MOVABLE DEVICE, PROJECTION APPARATUS, HEAD-UP DISPLAY, LASER HEADLAMP, HEAD-MOUNTED DISPLAY, AND OBJECT RECOGNITION APPARATUS

CROSS-REFERENCE TO RELATED APPLICATIONS

This patent application is based on and claims priority pursuant to 35 U.S.C. § 119(a) to Japanese Patent Application No. 2022-118222, filed on Jul. 25, 2022 and Japanese Patent Application No. 2023-089881, filed on May 31, 2023 in the Japan Patent Office, the entire disclosure of which is hereby incorporated by reference herein.

BACKGROUND

Technical Field

Embodiments of the present disclosure relate to a movable device, a projection apparatus, a head-up display (HUD), a laser headlamp, a head-mounted display, and an object recognition apparatus.

Related Art

A typical optical deflector can increase an enlargement ratio (i.e., a ratio of an angle of emission to an angle of incidence) of the deflection angle, or the angle of light deflection by more than four times, for example, by setting the aspect ratio to more than four for the shape of the dispersion surface in a wavenumber space.

SUMMARY

An embodiment of the present disclosure provides a movable device includes a supporting portion; a movable portion in the supporting portion, the movable portion movable about a first rotation axis and a second rotation axis intersecting with the first rotation axis; a member between the movable portion and the supporting portion and connected to the movable portion and the supporting portion in a connection direction. The member includes: a drive unit configured to move the movable portion; and an opening in a part of the drive unit.

An embodiment of the present disclosure provides a projection apparatus comprising an optical scanning system including the movable device described above.

An embodiment of the present disclosure provides a head-up display comprising the movable device described above.

An embodiment of the present disclosure provides a laser headlamp comprising the movable device described above.

An embodiment of the present disclosure provides a head-mounted display comprising the movable device described above.

An embodiment of the present disclosure provides an object recognition apparatus comprising the movable device described above.

An embodiment of the present disclosure provides an object recognition apparatus comprising the movable device described above.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is a cross-sectional view of the movable device in FIG. 1;

FIG. 3 is a plan view of a movable device according to a modification of the movable device according to the comparative example in FIG. 1;

FIGS. 4A-a and 4A-b are graphs of waveforms of voltage applied for rotation of a movable portion of a movable device about a first rotation axis according to an embodiment of the present disclosure;

FIGS. 4B-a and 4B-b are graphs of waveforms of voltage applied for the rotation of a movable portion of a movable device about a second rotation axis according to an embodiment of the present disclosure;

FIG. 10 is a cross-sectional view of a movable device according to an embodiment of the present disclosure;

FIG. 11 is a cross-sectional view of a movable device according to another embodiment of the present disclosure;

FIG. 17 is a diagram of a movable device with a shorter opening in each drive unit according to a fourth modification of an embodiment of the present disclosure;

FIG. 18 is a diagram of a movable device with a first opening in each drive unit according to a fifth modification of an embodiment of the present disclosure;

FIG. 19 is a diagram of a member with non-continuous openings according to a sixth modification of an embodiment of the present disclosure;

FIG. 23 is a diagram of a movable device with a line-symmetric meandering structure according to a ninth modification of an embodiment of the present disclosure;

FIG. 29 is a graph of a connecting portion with a unified structure according to a modification of an embodiment of the present disclosure;

FIG. 30 is a graph of a movable portion having a rectangular shape according to a thirteenth modification of an embodiment of the present disclosure;

FIG. 40 is a schematic view of a vehicle incorporating a laser imaging detection and ranging (LiDAR) device, according to an embodiment of the present disclosure;

FIG. 41 is a schematic view of the LiDAR device according to an embodiment of the present disclosure;

Figure 1:
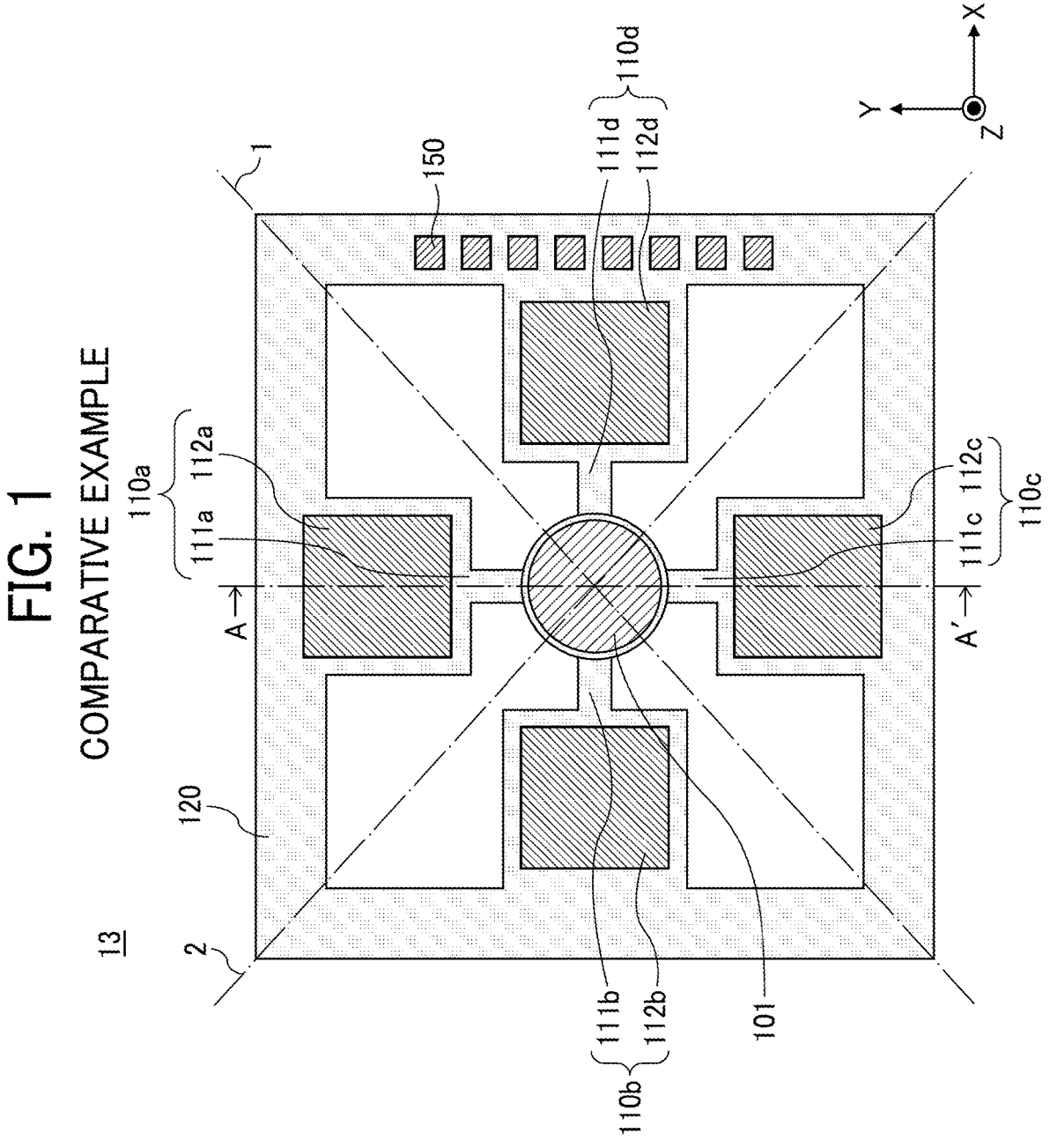
FIG. 1 is a plan view of a movable device according to a comparative example.
Figures 5A, 5B, 5C, 5D:
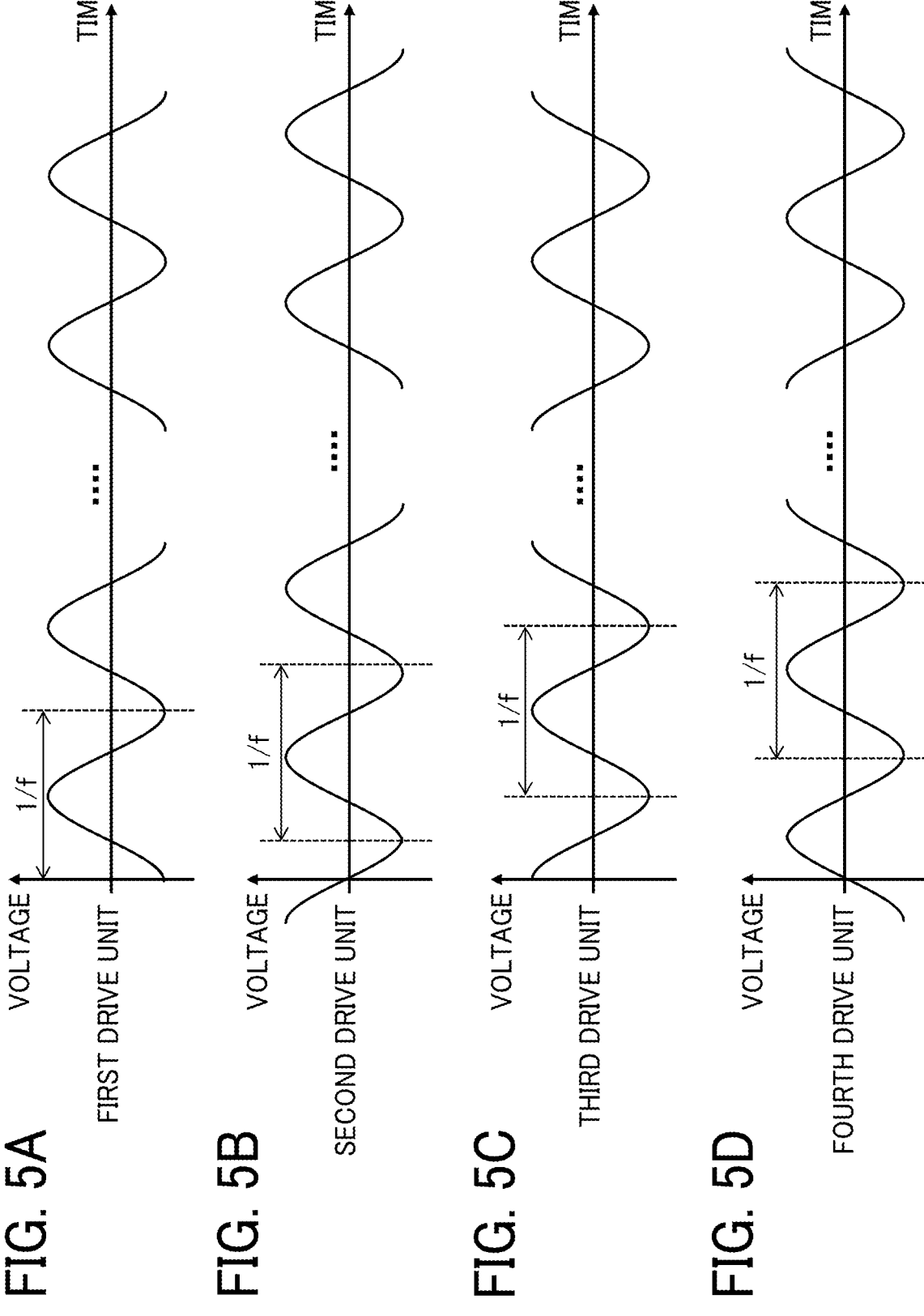
FIGS. 5A, 5B, 5C, and 5D are graphs of waveforms of voltage applied for the movement of the movable portion in a circle according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure provide a movable device that enables an increase in the deflection angle of the movable portion.

Embodiments of the present disclosure are described below with reference to the drawings. Like reference signs are applied to identical or corresponding components throughout the description of the drawings and redundant description thereof is omitted.

Configuration of Movable Device

FIG. 1 is a plan view of a movable device according to the comparative example. As illustrated in FIG. 1, a movable device 13 includes a mirror (or a movable portion 101) that reflects incident light; a first member 110*a*, a second member 110*b*, a third member 110*c*, and a fourth member 110*d*; a supporting portion 120 to secure the first member 110*a*, the second member 110*b*, the third member 110*c*, and the fourth member 110*d*; and an electrode connection portion 150 that is electrically connected to the first member to the fourth member and a control device. The first to fourth members (110*a* to 110*d*), which are connected to the mirror from four directions, drive the mirror. The first member 110*a* has a connection portion 111*a* and a drive unit 112*a*. The connection portion 111*a* and a drive unit 112*b* are similarly configured in the four members (110*a* to 110*d*).

In the present embodiment, the first member 110*a* is described as a representative of the members. The same configuration applies to the second member 110*b*, the third member 110*c*, and the fourth member 110*d*. In the following description, the first member 110*a* is used to describe differences in the mechanism of the movable device between embodiments of the present disclosure and the comparative example. A mechanism similar to that of the first member 110*a* applies to the second to fourth members 110*b* to 110*d*.

The movable device 13 includes, one silicon on insulator (SOI) substrate that is formed by any appropriate treatment method, such as etching. On the formed SOI substrate, the mirror, the first to fourth members (110*a* to 110*d*), and the electrode connection portion 150 are formed, which constitutes a single integrated unit of the above-described components.

The above-described multiple components may be formed after the SOI substrate is molded, or may be formed while the SOI substrate is being molded.

Figure 2:
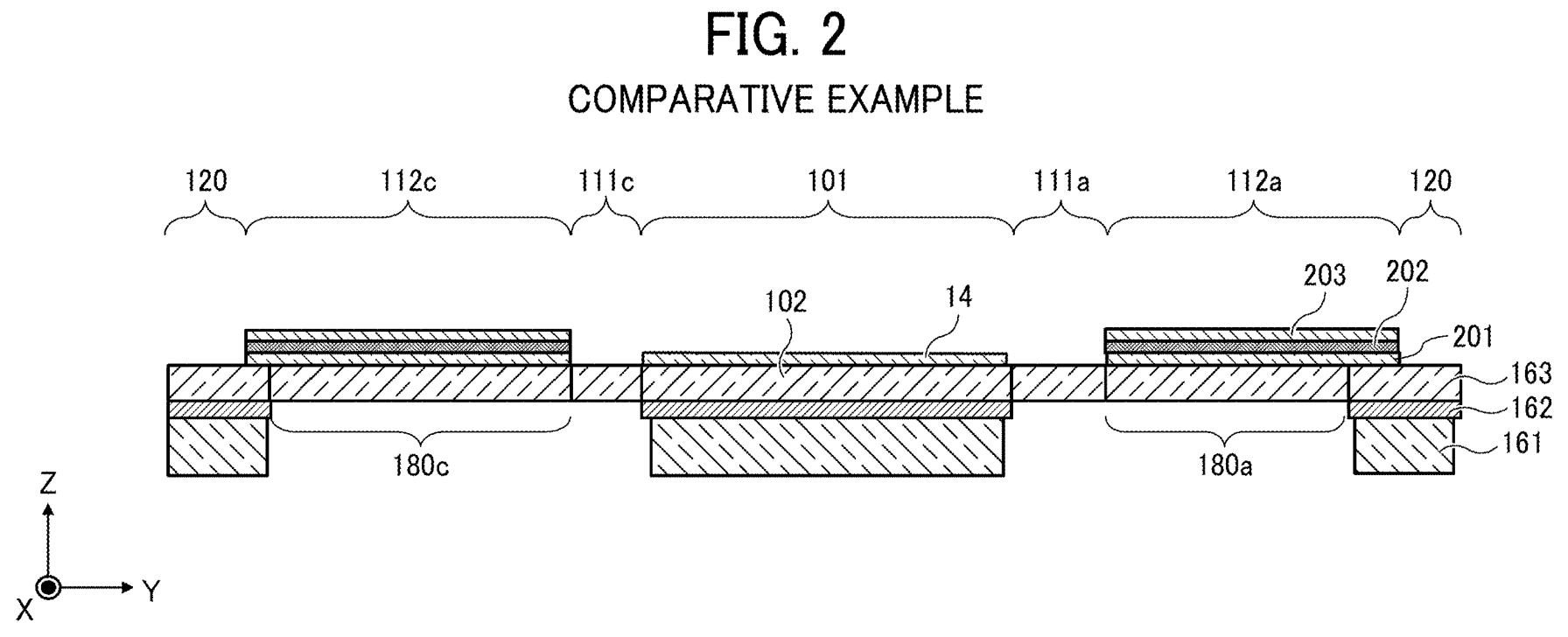

FIG. 2 is a cross-sectional view of the movable device taken along line A-A' in FIG. 1. The SOI substrate is a substrate in which, on a first silicon layer formed of single crystal silicon (Si), a silicon oxide layer 162 is formed, and on the silicon oxide layer 162, a second silicon layer formed of single crystal silicon is further formed. In the following description, the first silicon layer serves as a silicon supporting layer 161, and the second silicon layer serves as a silicon active layer 163.

The silicon active layer 163 has a smaller thickness in the Z-axis direction than the thickness in the X-axis direction or the Y-axis direction. With such a configuration, any member made of the silicon active layer 163 serves as an elastic member having elasticity.

In some embodiments, the SOI substrate has a curvature. In other words, the SOI substrate does not have to be planar. As long as the substrate can be integrally processed by, for example, etching and can be partially elastic, the member used for forming the movable device 13 is not limited to the SOI substrate.

The mirror includes, for example, a circular mirror base 102 and the reflecting surface 14 that is formed on the ±Z-side surface of the mirror base 102. The mirror base 102 includes, for example, a silicon active layer 163. The reflecting surface 14 includes a thin metal film containing aluminum (Al), gold (Au), and silver (Ag). Alternatively, the mirror includes a rib for strengthening the mirror unit on the —Z-side surface of the mirror-unit base 102. Such a rib includes, for example, the silicon supporting layer 161 and the silicon oxide layer 162, serving to prevent the distortion of the reflecting surface 14 due to the motion.

One end of each of the first member 110a and the third member 110c is connected to the mirror base 102, and the other end thereof is connected to the supporting portion 120. The first member 110a includes a connection portion 111a, a first drive unit 112a, and a support body of a first drive unit 112a. Two torsion bars (connection portions 111a and 111c) supporting the mirror to be movable extend in the first axis direction to be connected to a support body 180a of the first drive unit 112a and a support body 180c of the third drive unit 112c. The support bodies 180a and 180c are connected to the supporting portion 120. The drive unit 112a causes the movable portion 101 to oscillate by a positive deflection angle and a negative deflection angle via the connection portion 111a.

As illustrated in FIG. 2, the torsion bars, or connection portions 111a and 111c each includes the silicon active layer 163. The first drive unit 112a and the third drive unit 112c include the silicon active layer 163, a lower electrode 201, a piezoelectric portion 202, and an upper electrode 203. The lower electrode 201, the piezoelectric portion 202, and the upper electrode 203 are formed in this order on the +Z-side surface of the silicon active layer 163 serving as an elastic member. Each of the upper electrode 203 and the lower electrode 201 is made of, for example, gold (Au) or platinum (Pt). For example, the piezoelectric portion 202 is made of lead zirconate titanate (PZT), which is a piezoelectric material.

The supporting portion 120 is, for example, a rectangular support body including the silicon supporting layer 161, the silicon oxide layer 162, and the silicon active layer 163, surrounding the mirror (movable portion 101) and the first to fourth members (110a to 110d).

The electrode connection portion 150 is, for example, formed on the +Z-side surface of the supporting portion 120. The electrode connection portion 150 is electrically connected to the upper electrode 203 and the lower electrode 201 of the first drive unit 112a, the second drive unit 112b, the third drive unit 112c, and the fourth drive unit 112d, and to the control device 11 via electrode wiring of aluminum (Al). Each of the upper electrodes 203 and the lower electrodes 201 is directly connected to the electrode connection portion 150. Alternatively, the upper electrode 203 and the lower electrode 201 are indirectly connected to the electrode connection portion 150 through a wire that connects a pair of electrodes.

Although this embodiment has illustrated a case in which the piezoelectric portion 202 is formed on a surface (+Z surface) of the silicon active layer 163 serving as the elastic member, in some embodiments, the piezoelectric portion 202 is formed on another surface (for example, −Z surface) of the elastic member, or on both the surface and the other surface of the elastic member.

The shapes of the components are not limited to the shapes in the present embodiment as long as the mirror is rotatable about the first axis or the second axis. For example, the first to fourth connection portions (111a to 111d) and the first to the fourth drive units (112a to 112d) have a shape having a curvature, or curved shapes.

In some embodiments, an insulating layer including the silicon oxide layer is disposed on at least any one of the +Z-side surfaces of the upper electrode 203 of the first member 110a to the fourth member 110d and the +Z-side surface of the supporting portion 120. In this case, electrode wiring is provided on the insulating layer, and the insulating layer is partially removed as an opening or is not formed at a connection spot where the upper electrode 203 or the lower electrode 201 and the electrode wiring are connected, so that the the the first member 110a to the fourth member 110d, and the electrode wiring can be designed with a higher degree of freedom, and furthermore, a short circuit as a result of contact between electrodes can be substantially prevented. The silicon oxide film also serves as an anti-reflection member.

Figure 3:
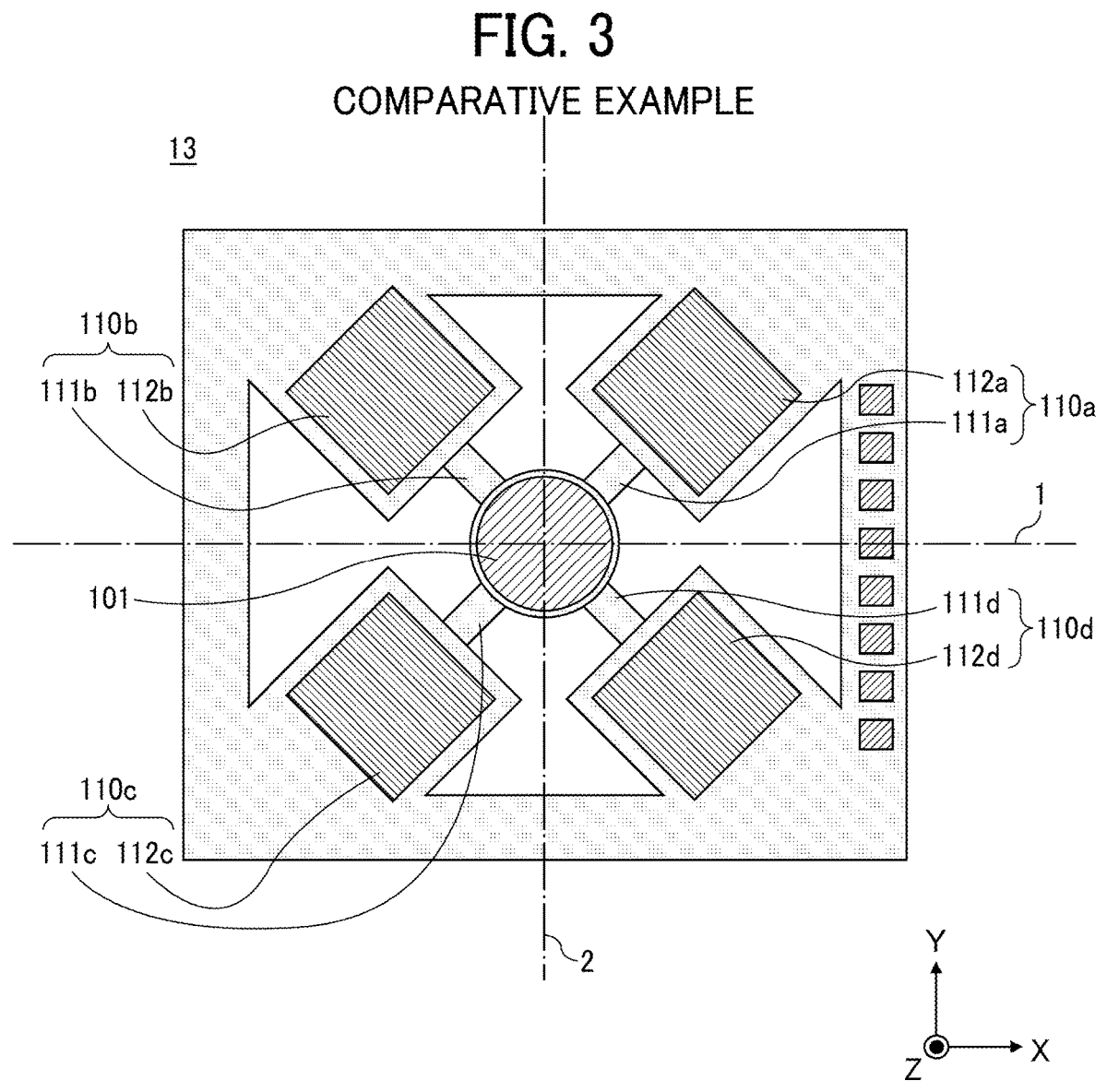

FIG. 3 is a plan view of a modified movable device of the movable device of the comparative example in FIG. 1. FIG. 3 differs from FIG. 1 in the relative position between the movable portion 101 and the connecting portion 111a. The shapes of the respective elements are not limited to those of the present modification. The material, manufacturing process, electrical connection, and control method can be implemented using similar configurations as in FIG. 1 and FIG. 2, but are not limited to those configurations. The driving system of the actuator is not limited to piezoelectric drive. Alternatively, the actuator is driven by electrostatic drive, electromagnetic drive, or thermoelectric drive.

Details of Control of Control Device

The following describes in detail the control of the control device that drives the first to fourth members of the movable device according to the comparative example. A method of controlling the movable device as described below is applicable in embodiments of the present disclosure.

The piezoelectric portions 202 of the first to fourth members (110a to 110d), when a positive or negative voltage in the polarization direction is applied thereto, are deformed (for example, expanded or contracted) in proportion to the potential of the applied voltage. This exhibits inverse piezoelectric effects. The first to fourth members (110a to 110d) move the mirror using the above-described inverse piezoelectric effect.

In this case, the angle between a reflecting surface 14 of the mirror and the XY plane when the reflecting surface 14 is tilted relative to the XY plane in the +Z-direction or −Z-direction is referred to as deflection angle. In particular, the +Z-direction represents a positive deflection angle and the —Z-direction represents a negative deflection angle.

In the first member 110a and the third member 110c in a cross-sectional plane of FIG. 2, when a driving voltage is applied in parallel to the piezoelectric portions 202 included in the first drive unit 112a and the third drive unit 112c via the upper electrode 203 and the lower electrode 201, the respective piezoelectric portions 202 are deformed. With such deformation of the piezoelectric portions 202, the first drive unit 112a and the third drive unit 112c bend and deform. For example, opposite voltages are applied to the respective electrodes so that the first member bends in the +Z-direction and the third member bends in the —Z-direction. This twists two torsion bars (connection portions 111a and 111c), which causes the mirror to oscillate, forming a positive or negative deflection angle.

A driving method to achieve two-dimensional deflection is described below. FIGS. 4A-(a), 4A-(b), 4B-(a), 4B-(b), 5A, 5B, 5C, and 5D are diagrams illustrating a driving method. FIGS. 4A-(a), 4A-(b), 4B-(a), and 4B-(b) are waveform graphs of drive signals of the first to the fourth drive units (112a to 112d). The signal waveform has a periodicity of frequency f.

FIG. 4A-a is a graph of a waveform of a drive signal input to a first drive unit 112a and a second drive unit 112b, which are in-phase, to rotate the movable portion 101 about a first rotation axis 1 according to an embodiment of the present disclosure. FIG. 4A-b is a graph of a waveform of a drive signal input to a third drive unit 112c and a fourth drive unit 112d, which are in-phase, to rotate the movable portion 101 about a first rotation axis 1 according to an embodiment of the present disclosure. FIG. 4B-a is a graph of a waveform of a drive signal input to the first drive unit 112a and the fourth drive unit 112d, which are in-phase, to rotate the movable portion 101 about a second rotation axis 2 according to an embodiment of the present disclosure. FIG. 4B-b is a graph of a waveform of a drive signal input to the second drive unit 112b and the third drive unit 112c, which are in-phase, to rotate the movable portion 101 about the second rotation axis 2 according to an embodiment of the present disclosure.

FIGS. 5A, 5B, 5C, and 5D are graphs of the waveforms of the drive signals to the first drive unit 112a, the second drive unit 112b, the third drive unit 112c, and the fourth drive unit 112d, respectively, which are phase-shifted by 90 degrees each. In this case, the optical scanning trajectory of the movable portion traces a two-dimensional circle. Although all the drive waveforms have the same frequency in the embodiment, no limitation is intended thereby. The frequency, amplitude and phase of each input waveform may be freely changed. This configuration allows the two-dimensional trajectory to be drawn. Although the offset amount is constant between the applied voltages as described in FIGS. 4A-a, 4A-b, 4B-a, 4B-b, 5A, 5B, 5C, and 5D, no limitation is intended herein. Alternatively, the offset amount differs between the applied voltages.

This configuration allows complicated control of the deflection angle. In addition, in a drive unit including one or more beams (e.g., the connection portion 111a), the deflection angle can be controlled in the positive direction and the negative direction by setting the reference voltage of the applied voltage signal for rotating (or oscillating) the first drive unit 112a and the second drive unit 112b (i.e., the applied voltage for the deflection angle of 0 degree), to the central value between maximum voltage values at which the movable portion rotates at a maximum amplitude.

The reference voltage is, for example, a 0 V. Alternatively, the reference voltage is any voltage within the maximum amplitude that is produced by an applicable voltage. The signal waveform of the applied voltage is not limited to the embodiments. In some examples, the signal waveform is a periodic waveform such as a sine wave, a rectangular wave, or a sawtooth wave. In some other examples, the signal waveform is a more complicated periodic waveform. In at least one example, the applied voltage is a direct current (DC) drive voltage. The vector scan is performed by driving at a non-resonant frequency, or the Lissajous scan is performed by bringing the frequency of the driving waveform close to the resonant frequency unique to the structure.

Further, complicated control is performed such that the driving unit in each member is divided into multiple sections and different signals are input to the respective drive units. Although the drive units serve as piezoelectric actuators, the driving method of the actuators is not limited to piezoelectric driving. Alternatively, the actuator is driven by electrostatic drive, electromagnetic drive, or thermoelectric drive.

Figure 6:
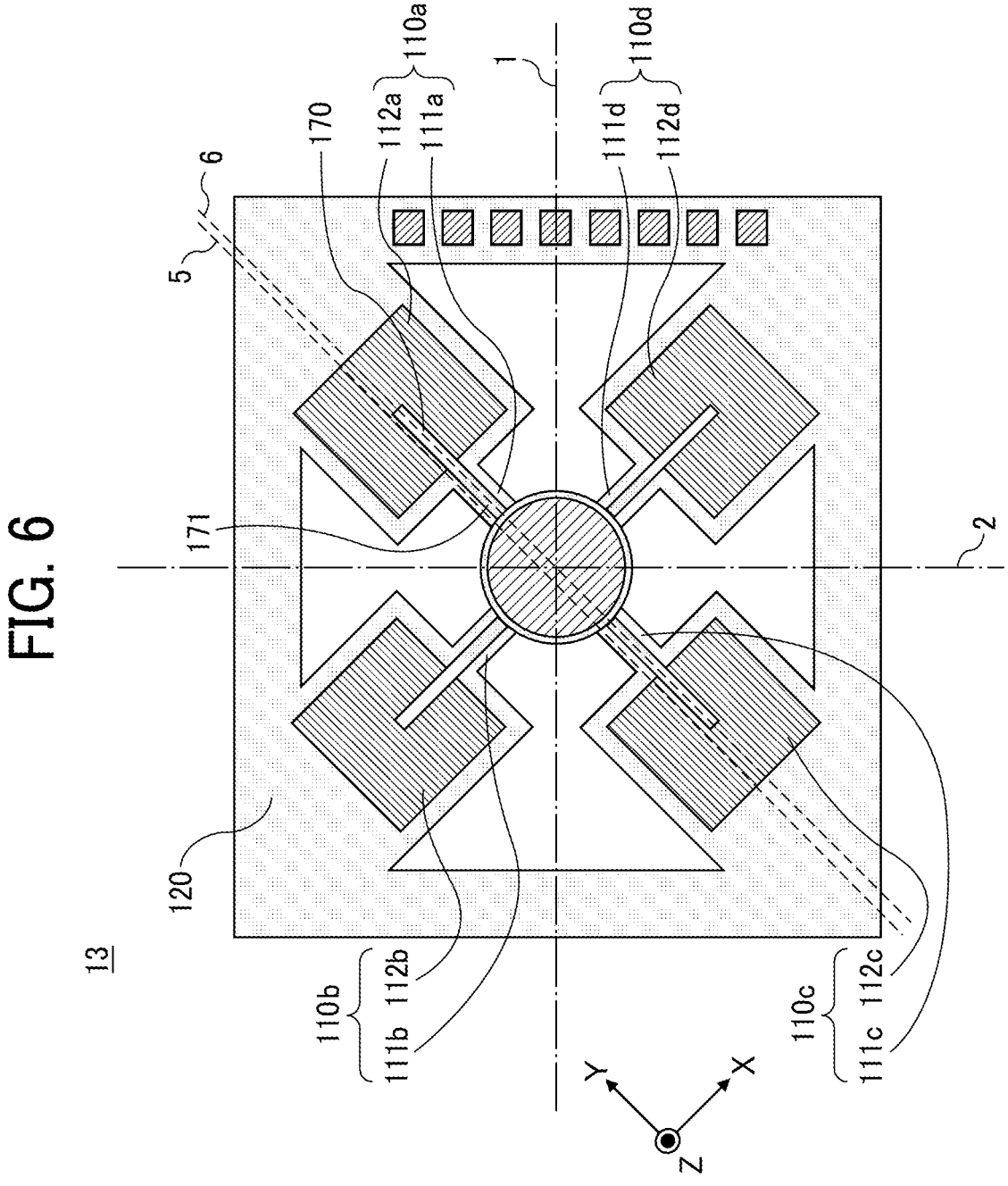
FIG. 6 is a plan view of a movable device according to an embodiment of the present disclosure.

FIG. 6 is an illustration of a movable device according to an embodiment of the present disclosure. An embodiment of the present disclosure features an opening included in each of first to fourth members (110a to 110d). The first member 110a, the first drive unit 112a has a first opening 170, and the connection portion 111a has a second opening 171. The first opening 170 and the second opening 171 are continuous with each other. At least a portion of the connection portion 111a is bisected by the second opening 171 formed in the connection portion 111a. This enables an increase in the amount of oscillation.

The configuration of the movable device is similar to that of the movable device in FIG. 3. The movable device according to the present embodiment adopts the driving method described above. Following the driving method as described above, the oscillations of the first to fourth drive units (112a to 112d) are combined for control. This enables the movable portion 101 to oscillate in a desired direction, thus allowing the Lissajous scan or vector scan in the drawing region (or the scanning range).

In the present embodiment, the movable device includes a first member 110a, a second member 110b, a third member 110c, and the fourth member 110d. The first member 110a includes a first drive unit 112a and has one end connected to the supporting portion 120 and the other end connected to the movable portion 101. The second member 110b includes a second drive unit 112b and has one end connected to the supporting portion 120 and the other end connected to the movable portion 101. The third member 110c includes a first drive unit 112c and has one end connected to the supporting portion 120 and the other end connected to the movable portion 101. The fourth member 110d includes a fourth drive unit 112d and has one end connected to the supporting portion 120 and the other end connected to the movable portion 101. The movable portion 101 is oscillable about both a first rotation axis 1 and a second rotation axis 2 intersecting the first rotation axis 1.

As illustrated in FIG. 6, a movable device 13 includes a supporting portion 120, a movable portion 101 in the supporting portion 120, and a member 110a. The movable portion 101 is movable about a first rotation axis 1 and a second rotation axis 2 intersecting with the first rotation axis 1. The member (e.g., the first member 110a) is between the movable portion 101 and the supporting portion 120 and is connected to the movable portion 101 and the supporting portion 120 in a connection direction. The member (e.g., the first member 110a) includes a drive unit 112a configured to move the movable portion 101; and an opening (i.e., the first opening 170) in a part of the drive unit 112a.

The movable portion 101 is connected to the member (e.g., the first member 110a) is at a first position, and the supporting portion 120 is connected to the member (e.g., the first member 110a) at a second position different from the first position.

The member (e.g., the first member 110*a*) further includes a connection portion 111*a* having another opening (i.e., the second opening 171) in the connection portion (111*a*).

The opening (i.e., the first opening 170) and said another opening (i.e., the second opening 171) are continuous in the connection direction.

The opening (i.e., the first opening 170) and said another opening (i.e., the second opening 171) are continuous from a boundary between the movable portion 101 and the connection portion 111*a* to a part of the drive unit (e.g., the first drive unit 112*a*).

The drive unit (e.g., the first drive unit 112*a*) is symmetrical with respect to the opening (i.e., the first opening 170) in a lateral direction orthogonal to the connection direction.

Said another opening (i.e., the second opening 171) has an end aligned with the boundary between the movable portion 101 and the connection portion 111*a*.

The movable device 13 according to the present embodiment includes four members (i.e., the first to fourth member 110*a* to 110*d*) respectively including drive units (i.e., the first to fourth drive units 112*a* to 112*d*). The drive units cause the movable portion 101 to oscillate about the first rotation axis 1 and the second rotation axis 2 in accordance with electrical signals respectively applied to the drive units. Amplitude and phase of the electrical signals are individually adjustable.

Figure 7:
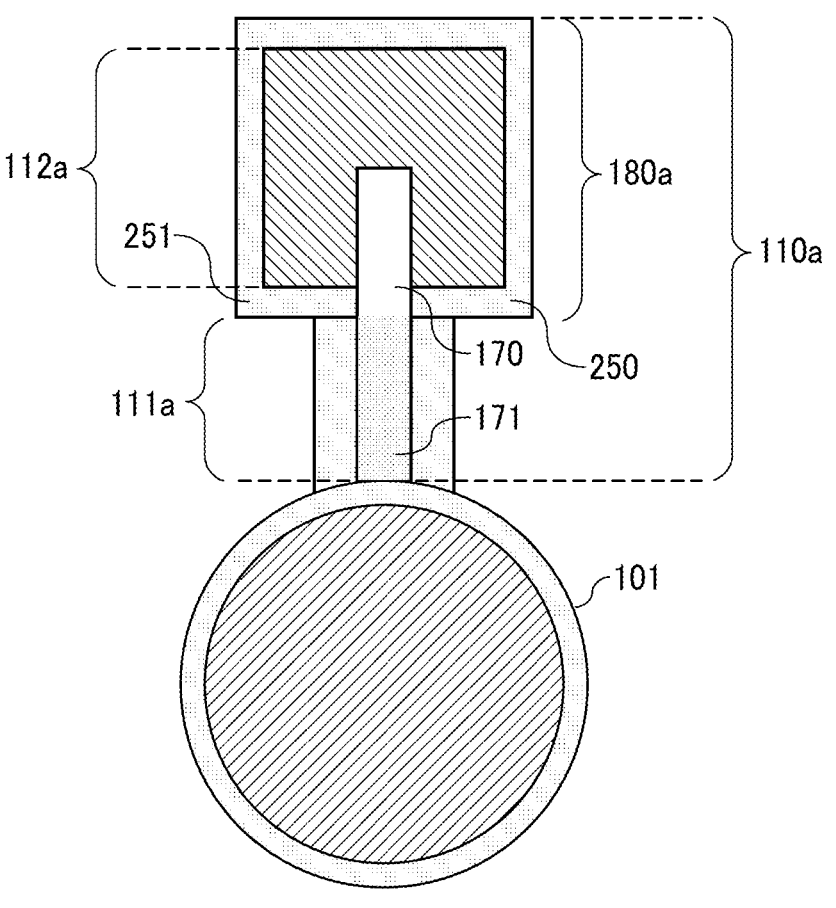
FIG. 7 is a plan view of a member according to an embodiment of the present disclosure.

FIG. 7 is an enlarged view of the first member 110*a* according to an embodiment, illustrating the first member 110*a* in detail.

The first member 110*a* includes a first drive unit 112*a*, a support body 180*a* supporting the first drive unit 112*a*, and a connection portion 111*a*. The first drive unit 112*a* is formed inside a fixed-width frame at the edge of the support body 180*a* of the first drive unit 112*a*. The boundary between the connection portion 111*a* and the support body 180*a* of the first drive unit 112*a* has a different width. When the width continuously decreases, a line extending from the frame of the support body 180*a* of the first drive unit 112*a* is used as the boundary between the support body 180*a* and the connection portion 111*a*.

In the embodiment illustrated in FIG. 7, the widths of the first opening 170 and the second opening 171 in the lateral direction at the boundary between the support body 180*a* and the connection portion 111*a* of the first drive unit 112*a* are equal to each other. In this case, the free ends 250 and 251 of the support body 180*a* of the first drive unit 112*a*, to which the connection portion 111*a* is not connected, moves significantly. This might hamper the driving force from being properly transmitted to the movable portion 101. Since the displacement of portions in and around the free ends 250 and 251 results in wasteful loss of input energy, the connection portion is disposed to reduce such displacement enhances the drive efficiency.

Figure 8:
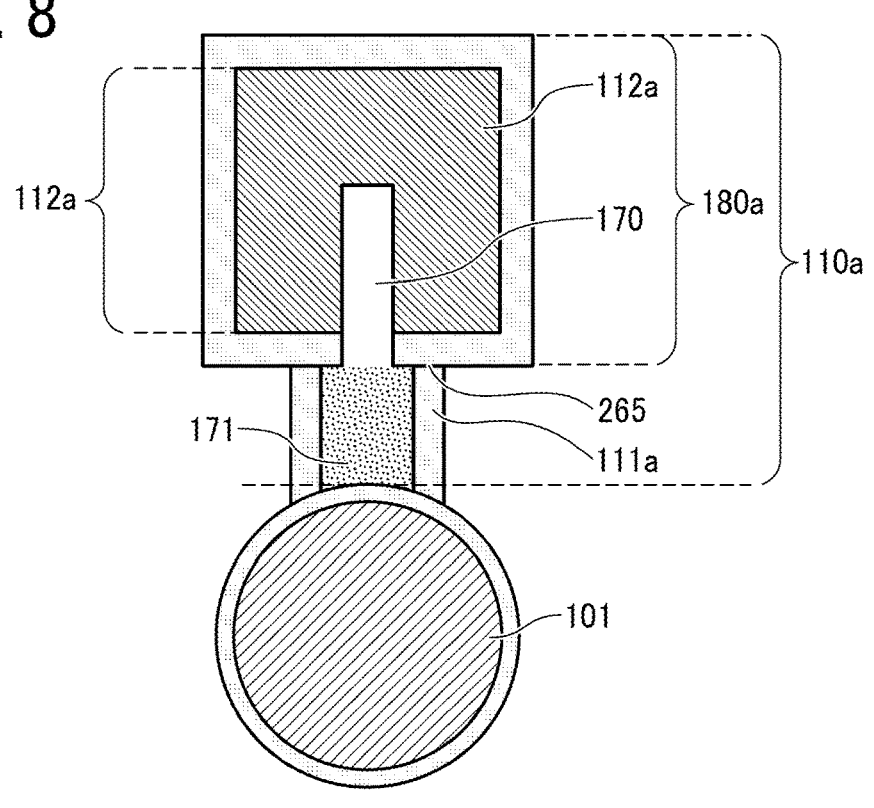
FIG. 8 is a plan view of a member with a wide opening of a connection portion according to an embodiment of the present disclosure.

FIG. 8 is an illustration of a member 110*a* including a first drive unit 112*a*, a connection portion 111*a*, and a support body 180*a* according to another embodiment of the present disclosure, which enhances the drive efficiency of the movable device. In the present embodiment, a second opening 171 is broader in width than a first opening 170 in a lateral direction at the boundary between the support body 180*a* and the connection portion 111*a*. A connection site 265 between the support body 180*a* and the connection portion 111*a* is changed so that the second opening 171 of the connection portion 111*a* is broader in width than the first opening 170 of the support body 180*a*. In other words, the opening width of the second opening 171 of the connection portion 111*a* is increased in the width direction of the support body 180*a* of the first drive unit 112*a*. This facilitates the transmission of the driving force to the movable portion 101, thus enhancing the oscillation of the movable portion 101. As a result, an unnecessary displacement of the free ends 250 and 251 as illustrated in FIG. 7 is reduced, and the drive efficiency is increased.

Figure 9:
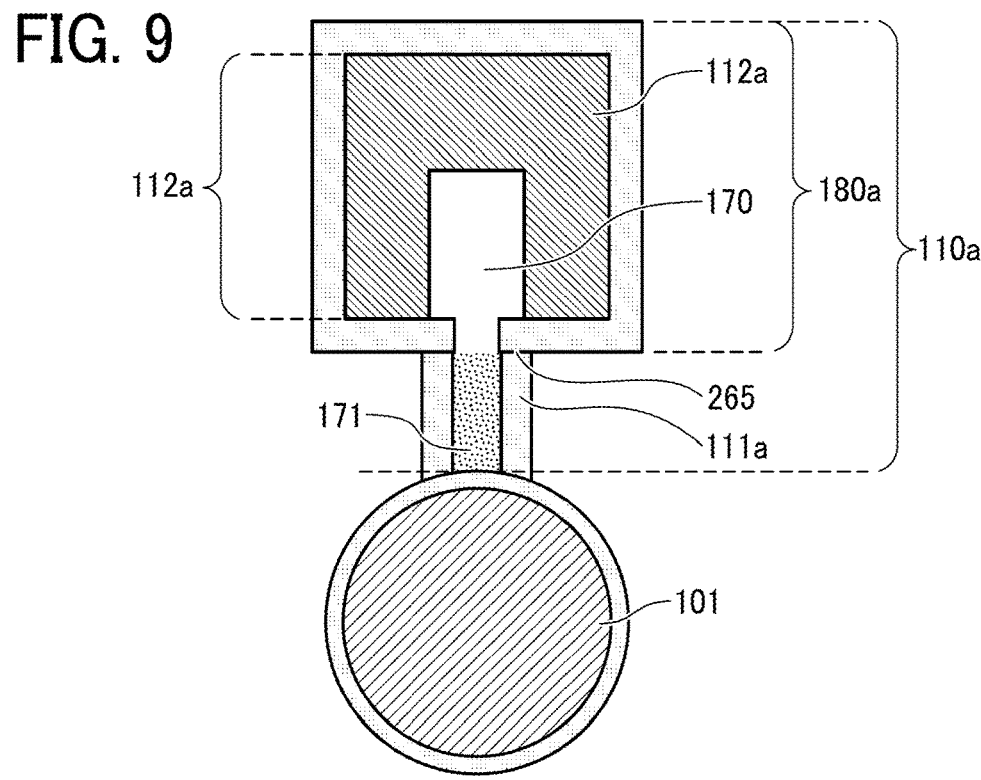
FIG. 9 is a plan view of a member with a wide opening of a drive unit according to an embodiment of the present disclosure.

In an embodiment illustrated in FIG. 9, the first opening 170 is broader in width than the second opening 171 in a lateral direction at the boundary between the support body 180*a* of the first drive unit 112*a* and the connection portion 111*a*. A connection site 265 between the support body 180*a* and the connection portion 111*a* is changed so that the second opening 171 of the connection portion 111*a* is narrower in width than the first opening 170 of the support body 180*a*. In other words, the opening width of the first opening 170 of the support body 180*a* of the first drive unit 112*a* is increased, whereas the opening width of the second opening 171 of the connection portion 111*a* is reduced. This enables a higher stiffness of the support body 180*a* of the first drive unit 112*a*. Thus, the stiffness of the support body 180*a* is minimized, thereby increasing the driving force for the oscillation of the movable portion 101. In the present embodiment, the movable portion 101 is concurrently supported at four locations. This is particularly an effective measure for enhancing the driving force in the present embodiment.

Figure 10:
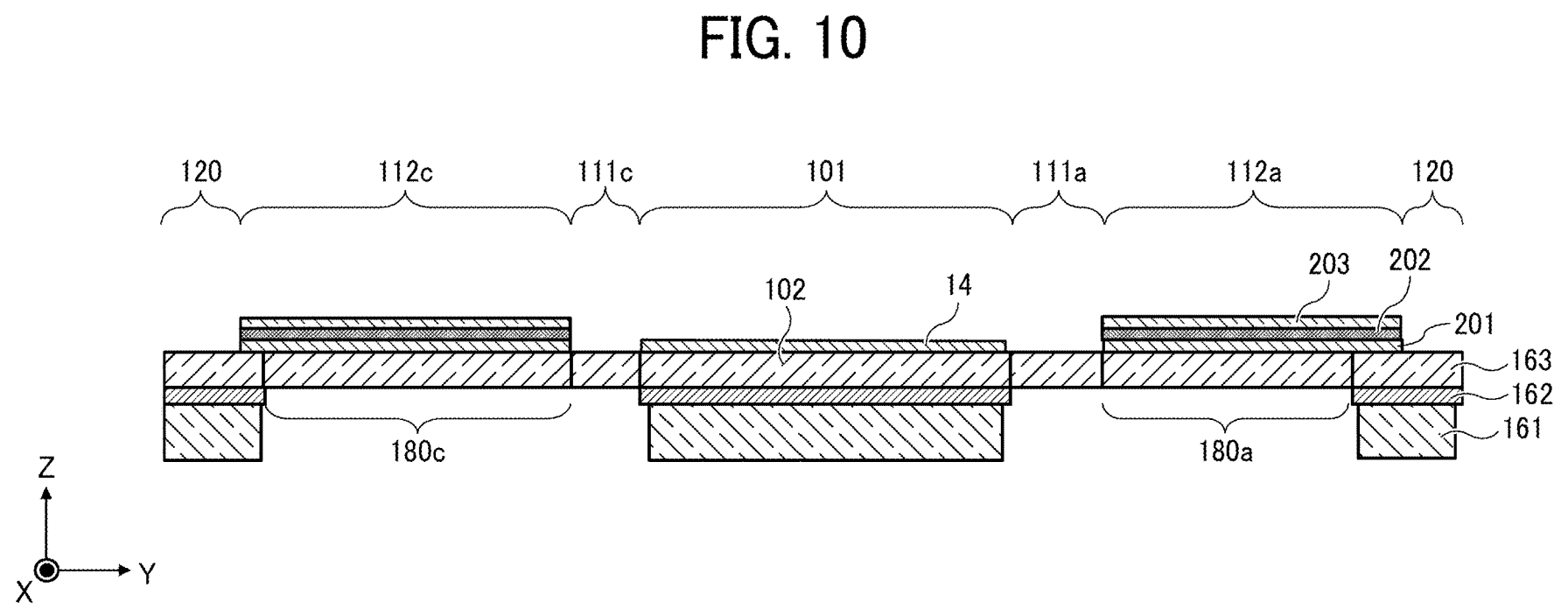

FIG. 10 is a cross-sectional view taken along a straight line 5 in FIG. 6. A first member 110*a* includes a connection portion 111*a* and a support body 180*a* of a first drive unit 112*a*. The connection portion 111*a* and the support body 180*a* of the first drive unit 112*a* include a silicon active layer 163. The first drive unit 112*a* includes an upper electrode 203, a piezoelectric portion 202, and a lower electrode 201 disposed on the silicon active layer 163, and the piezoelectric portion 202 is patterned. The support body 180*a* of the first drive unit 112*a* is the silicon active layer 163, which is continuous with the supporting portion 120. The mechanical strength of the supporting portion 120 is enhanced by the silicon support layer 161 and the silicon oxide layer 162 disposed below the silicon active layer 163.

Figure 11:
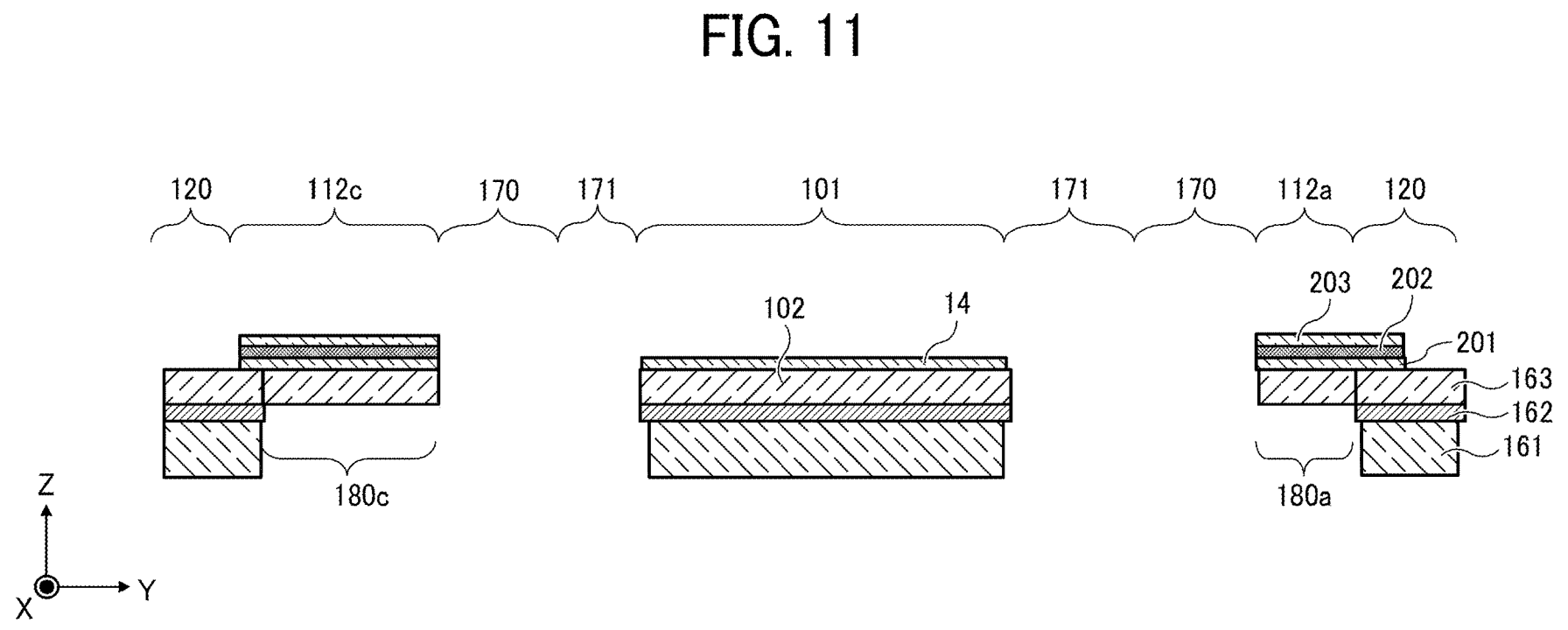

FIG. 11 is a cross-sectional view taken along a straight line 6 in FIG. 6. The first opening 170 is in the first drive unit 112*a* and penetrates through the silicon active layer 163. The first drive unit 112*a* includes an upper electrode 203, a piezoelectric portion 202, and a lower electrode 201, and an upper opening is formed on an upper surface of the first drive unit 112*a*. The upper opening penetrates the support body 180*a* for drive unit in the —Z-direction to form a lower opening. The upper opening and the upper opening are connected in parallel in the Z-direction to form a first opening 170 penetrating each layer.

The second opening 171 is in the connection portion 111*a*, penetrating the silicon active layer 163.

In a modification of the embodiment of the present disclosure, an opening is formed, penetrating the upper electrode 203, the piezoelectric portion 202, and the lower electrode 201, which defines the first drive unit 112*a*, and without penetrating the silicon active layer 163. Such an opening also exhibits the similar effect to that of the above-described embodiment.

Figure 12:
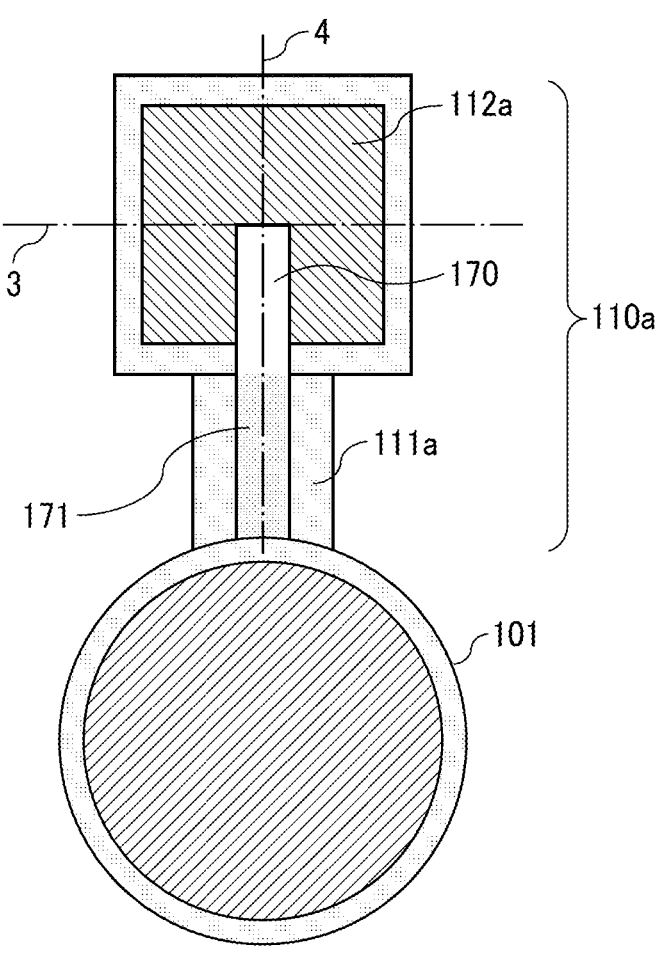
FIG. 12 is a plan view of a member according to an embodiment of the present disclosure.

FIG. 12 is an enlarged view of the first member 110*a*, illustrating the relative position between a first opening 170 and a second opening 171 according to an embodiment of the present disclosure. The first opening 170 and the second opening 171 are disposed on a straight line 4 passing through the center of the first member 110*a*. The first member 110*a*, the first opening 170, and the second opening 171 are arranged in line symmetry with respect to the straight line 4. This arrangement enhances the oscillation of the movable portion equally around the first rotation axis 1 and the second rotation axis 2 (e.g., an increase in the deflection angle). In this embodiment, The end of the first opening 170 is aligned with the position of the straight line 3 passing through the center of the first drive unit 112*a*. In this case, the ends of an opening as a whole including the first opening 170 and the second opening 171 refer to two shorter sides of the rectangular opening. In FIG. 12, the ends of the opening are located in a direction in which the opening extends (i.e., an extension direction). One end of the opening is located inside the first drive unit 112*a*, and the other end is near the boundary between the opening and the movable portion 101.

The straight line 3 passing through the center of the first drive unit 112*a* exhibits a high number of frequencies where the displacement due to vibration reaches a node. Since the end of the first opening 170 is aligned with the position of the straight line 3, the probability of reducing damage caused by stress concentration at the end increases. The first drive unit 112*a* in FIG. 12 has a rectangular shape, meaning that the center of the first drive unit 112*a* is the center of the rectangular shape. The straight line 4 connects the center of the rectangular shape to the center of the movable portion 101.

The straight line 3 intersects with the straight line 4 perpendicularly at the center of the first drive unit 112*a*. A second opening is formed in the extension direction of the straight line 4. The end of the opening is at the boundary between the opening and the movable portion 101, and the other end is inside the first drive unit 112*a*. In this arrangement, the connection portion has an opening at its central portion. The opening divides the connection portion into two portions (e.g., a first portion and a second portion. In the present disclosure, "the opening divides the connection portion into two portions" refers to connection portion that is separated into two portions: a first portion and a second portion.

A second opening is formed in the extension direction of the straight line 4. The end of the opening is at the boundary between the opening and the movable portion 101, and the other end is inside the first drive unit 112*a*. In this arrangement, the connection portion has an opening at its central portion. The opening divides the connection portion into two portions (e.g., a first portion and a second portion). In the present disclosure, "the opening divides the connection portion into two portions" refers to connection portion that is separated into two portions: a first portion and a second portion.

The connection portion 111*a* has a first portion and a second portion separated from the first portion by said another opening (i.e., the second opening 171). The first portion and the second portion are symmetrical with respect to a line passing through a center of said another opening (i.e., the second opening 171) along the connection direction.

The opening has a rectangular shape as illustrated in FIG. 12. A straight line passing through the center of the rectangular shape in the extension direction and another straight light in a direction orthogonal to the extension direction can be drawn. The straight line in the extension direction coincides with the straight line 4. This arrangement enhances the oscillation around the first rotation axis 1 and the second rotation axis 2 equally (e.g., an increase in the deflection angle).

Figure 13:
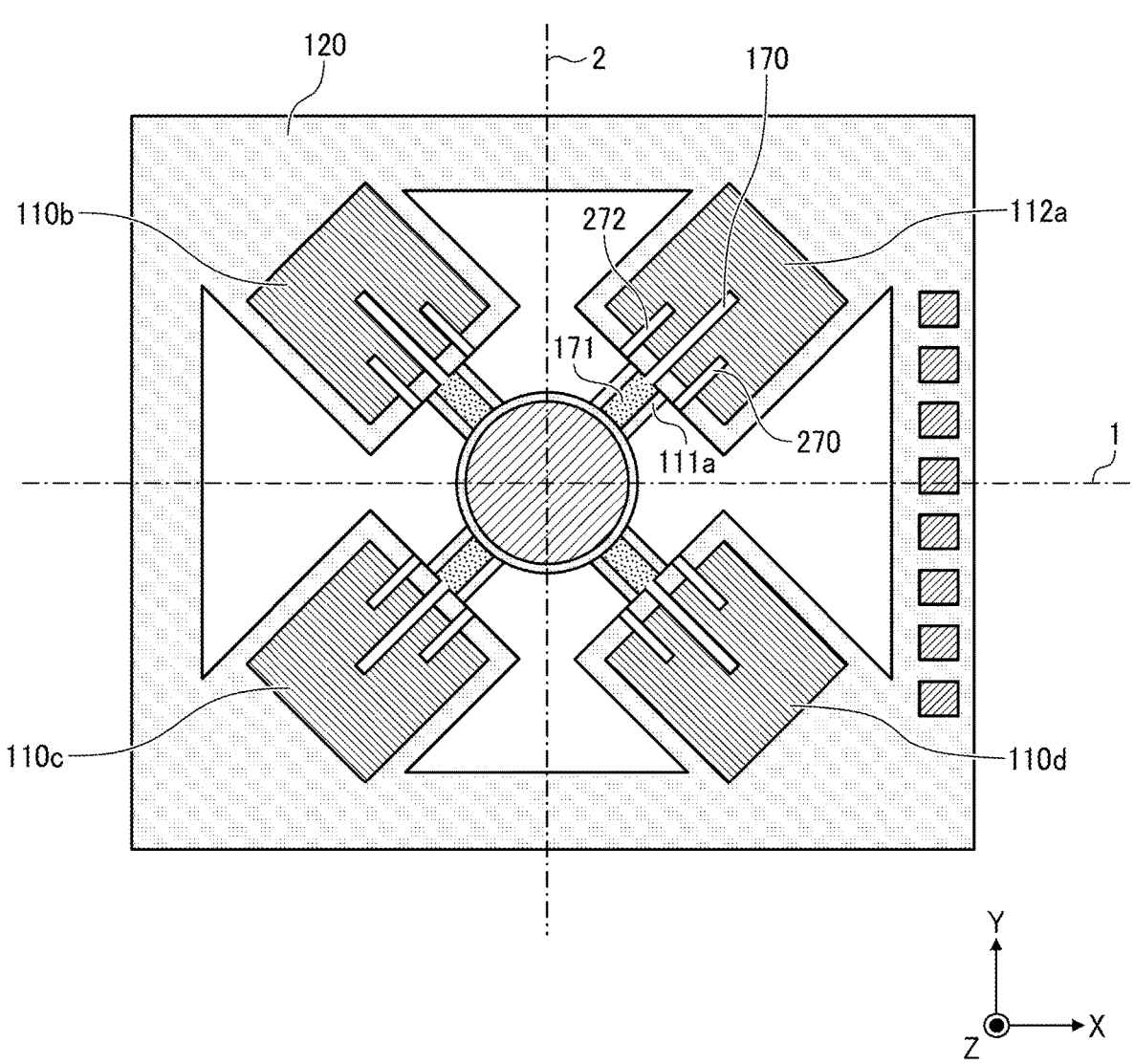
FIG. 13 is a diagram of a movable device with three openings in each drive unit according to a first modification of an embodiment of the present disclosure.

FIG. 13 is an illustration of a movable device according to a first modification of an embodiment of the present disclosure. In the first modification, the first drive unit 112*a* includes a first opening 170, a fourth opening 270, and a fifth opening 272. The fourth opening 270 and the fifth opening 272 are shorter than the first opening 170 in the longitudinal direction. The fourth opening 270 and the fifth opening 272 are substantially parallel to the first opening 170. This configuration allows a lower stiffness of the connection portion 111*a* and thus increases the amount of oscillation of the movable portion 101. The fourth opening 270 and the fifth opening 272 may have any interval therebetween, any length in the longitudinal direction and the lateral direction, and any shape as long as the above-described effects are exhibited.

Figure 14:
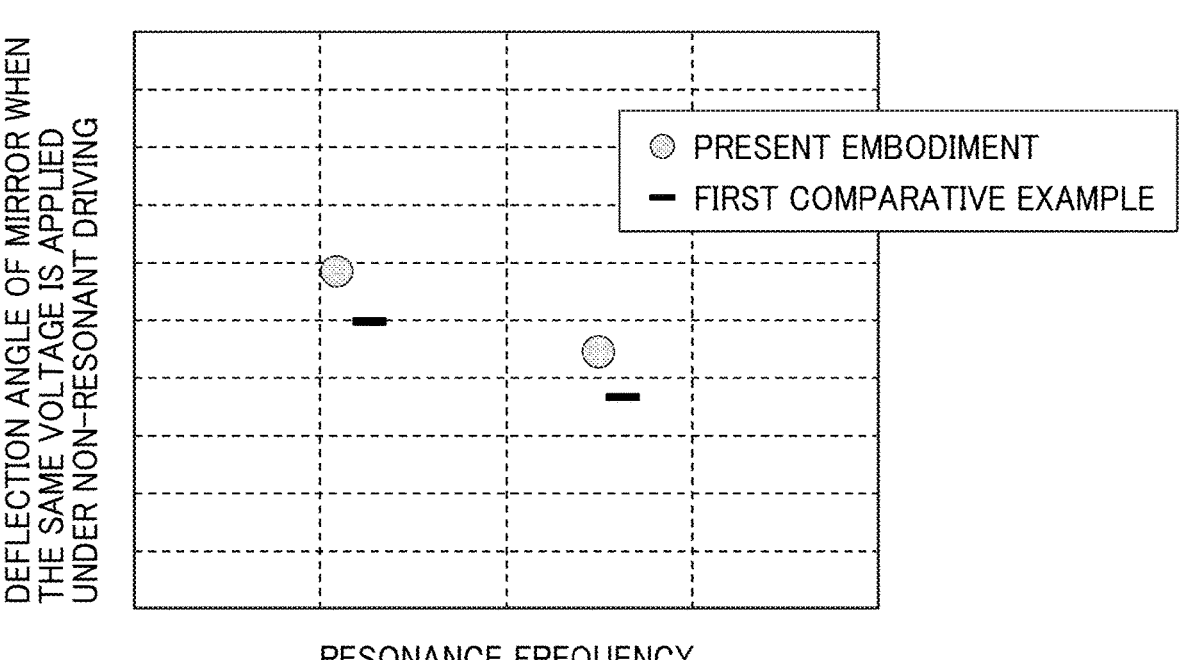
FIG. 14 is a graph of simulation results for an embodiment of the present disclosure and the comparative example.

FIG. 14 is a graph of simulation results for an embodiment of the present disclosure and the example of the comparative example. The movable device according to the comparative example is not provided with a first opening 170 as illustrated in FIG. 1. According to the comparison results of the deflection angles of the mirror at the time of non-resonant driving during the oscillation of the movable portion 101 having the same mirror diameter, the first modification provided with the first opening 170 enables a higher deflection angle for the equivalent resonant frequency.

In the movable device of the comparative example, the connection portion between the first member 110*a* and the movable portion 101 linearly connects the end of the first member 110*a* to the movable portion 101. In the present embodiment, the first member 110*a* provided with the first opening 170 increases a two-dimensional deflection angle and enables lower power consumption and fewer needed circuit components. This further can minimize the overall size of the movable device for the same deflection angle.

Figure 15:
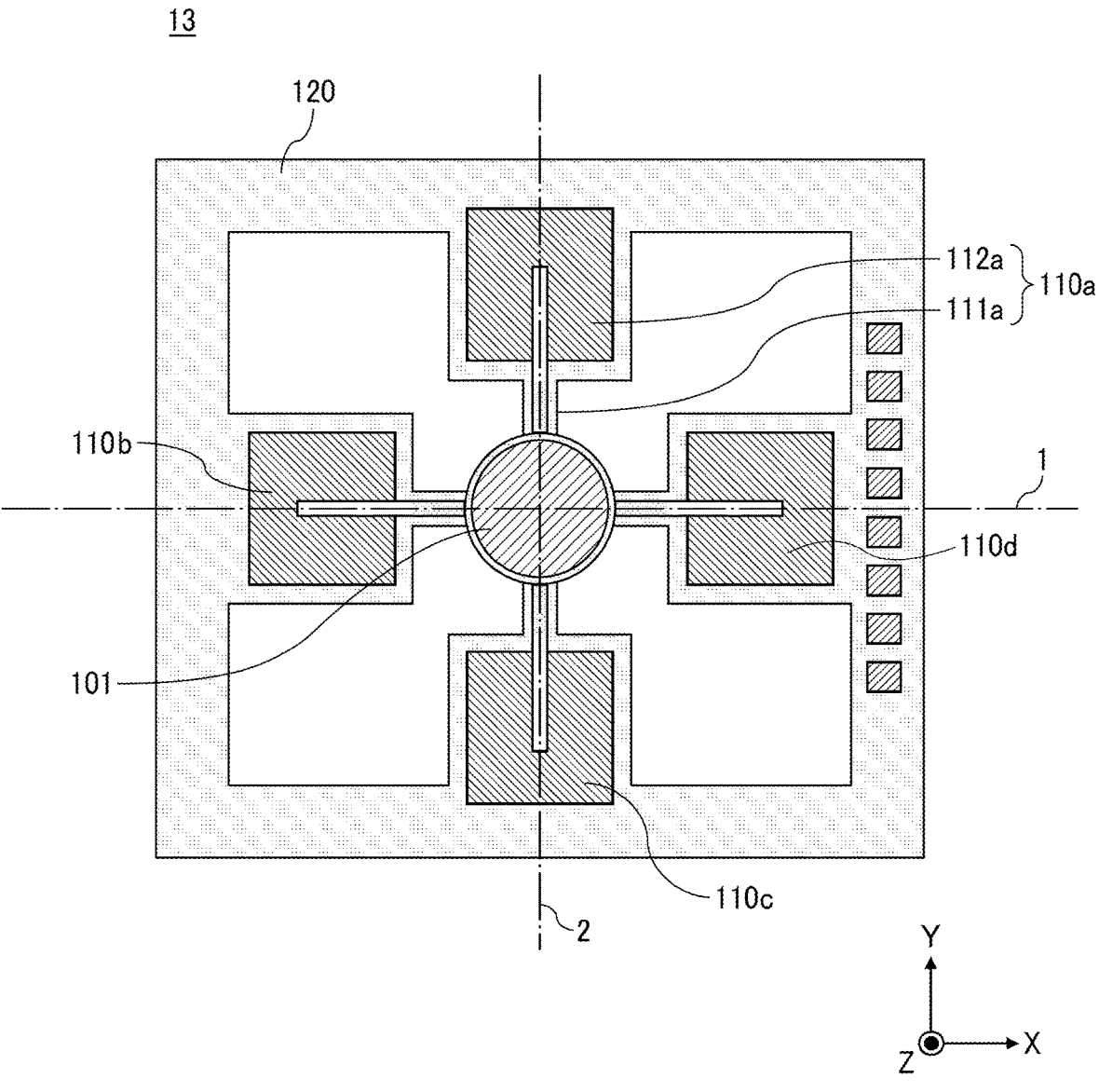
FIG. 15 is a diagram of a movable device with members arranged in a cross according to a second modification of an embodiment of the present disclosure.

FIG. 15 is a diagram of a movable device according to a second modification of an embodiment of the present disclosure. In the first modification example, the rotation axis of the drive units 112*a*, 112*b*, 112*c*, and 112*d* are parallel or perpendicular to the first rotation axis 1 and the second rotation axis 2. In a plan view (YX plane) of the present modification, the drive units are disposed at substantially 0 degree or substantially 90 degrees. Such a relative position between the drive units also enables an increase in the deflection angle.

However, as illustrated in FIG. 6 according to an embodiment of the present disclosure, the first drive unit 112*a*, the second drive unit 112*b*, the third drive unit 112*c*, and the fourth drive unit 112*d* are positioned at substantially 45 degrees relative to the first rotation axis 1 and the second rotation axis 2. In other words, a straight line extending from the center of the movable portion 101 to the center of the first drive unit 112*a* lies in a direction substantially 45 degrees relative to the first rotation axis 1 and the second rotation axis 2. This arrangement is suitable for increasing the deflection angle of the vector scan.

The oscillation of the first to fourth drive units 112*a* to 112*d* has vectors for both the first rotation axis 1 and the second rotation axis 2. The present embodiment provided with the opening enables an increase in the amount of rotation of the movable portion for both the first rotation axis 1 and the second rotation axis 2.

Preferably, the first opening 170 and the second opening 171 are disposed on the straight lines extending from the center of the movable portion 101 to the centers of the first to fourth drive units 112*a* to 112*d*, respectively (i.e., on the lines that equally divide the first to fourth drive units 112*a* to 112d, respectively into two). However, the effect of increasing the amount of rotation can be obtained even at substantially equal positions.

Effects of an embodiment of the present disclosure is described below.

The first drive unit 112a, the second drive unit 112b, the third drive unit 112c, and the fourth drive unit 112d are combined to drive the movable portion 101 to oscillate about the first rotation axis 1 and the second rotation axis 2. To achieve the oscillation of the movable portion 101, adjacent drive units move in phase or out of phase with each other.

In one example, rotation around the first rotation axis 1 is established when the first drive unit 112a and the second drive unit 112b move in phase and the third drive unit 112c and the fourth drive unit 112d move out of phase with each other. In this case, portions of the first member 110a and the second member 110b closer to the third member 110c and the fourth member 110d are more constrained by the out-of-phase movement. Portions of the third member 110c and the fourth member 110d closer to the first member 110a and the second member 110b are more constrained by the movement in opposite phase to its own.

In view of such circumstances, the first opening 170 in each drive unit and the second opening 171 in the connection portion 111a allows the oscillation of the movable portion 101 by mitigating the constraint on the oscillation of the movable portion 101 caused by adjacent members.

In particular, the first opening 170 positioned on the line that substantially divides the drive unit (e.g., the first drive unit 112a) into two portions in a plan view (YX plane) achieves equal effects in two-dimensional oscillation. In this case, the first opening 170 may be positioned on the line that substantially divides the drive unit into two portions (the line approximately bisects the drive unit), which means that the drive unit does not have to be exactly divided into two.

The connection portions 111a to 111d connecting the members 110a to 110d to the movable portion 101 each are at least partially divided by the second opening 171. Preferably, the connection portions 111a to 111d are substantially line-symmetrical with respect to the second opening 171 and its extension line in a plan view (YX plane). Alternatively, the connection portions 111a to 111d are substantially line-symmetrical with respect to the second opening 171 and a line substantially parallel to its extension line in a plan view (YX plane).

In some embodiments, a portion of the connection portion 111a close to the movable portion 101 has a shape in which divided beams are merged into one. Alternatively, the connection portion 111a that is divided by the opening is connected to the movable portion 101 at two sites, or locations. In this case, one end of the second opening 171 coincides with the end of the movable portion 101, whereas the connection portion 111a is connected to the movable portion 101 at two sites (locations). This arrangement facilitates the oscillation of the movable portion 101 about both the first rotation axis 1 and the second rotation axis 2.

Using such two connection sites with the movable portion 101 reduces risks in handling, such as damage to the movable portion and the connection portion, during the manufacturing and assembly processes. This, in turn, increases yield rates and lowers costs.

For the driving conditions for the oscillation of the movable portion, the reference voltage of each drive unit is 0V or offset positively or negatively. Alternatively, the reference voltage is the center voltage of the maximum amplitude of the applied voltage. In some embodiments, the signal waveform is a periodic waveform such as a sine wave, a rectangular wave, or a sawtooth wave. In some other examples, the signal waveform is a more complicated periodic waveform. The applied voltage may be a direct current (DC) drive voltage. The driving principle of the driving unit and the driving source are not limited to a piezoelectric driving, but may be electrostatic drive, electromagnetic drive, or thermoelectric drive.

In some embodiments, the first to fourth members 110a, 110b, 110c, and 110d including the first to fourth drive units 112a, 112b, 112c, and 112d, respectively have functions or elements other than the drive units. For example, the first to fourth members 110a, 110b, 110c, and 110d each include a detector for detecting displacements, a heater or electric wiring. The number of the electrode connection portions 150 is not limited to those illustrated in the drawings.

In an effective case, the first to fourth members 110a, 110b, 110c, and 110d are provided with PZT films for detecting the strain of the members, as the elements other than the drive units. The PZT film in each member detects the stress applied to a connecting portion between the first opening 170 and the second opening 171. Based on the detected stress, the opening shape can be designed to reduce the stress applied to the openings and further increase the deflection angle. Further, by detecting the displacement around the first aperture, disturbance vibrations occurring near the aperture are detected and adjusted to be reduced.

Figure 16:
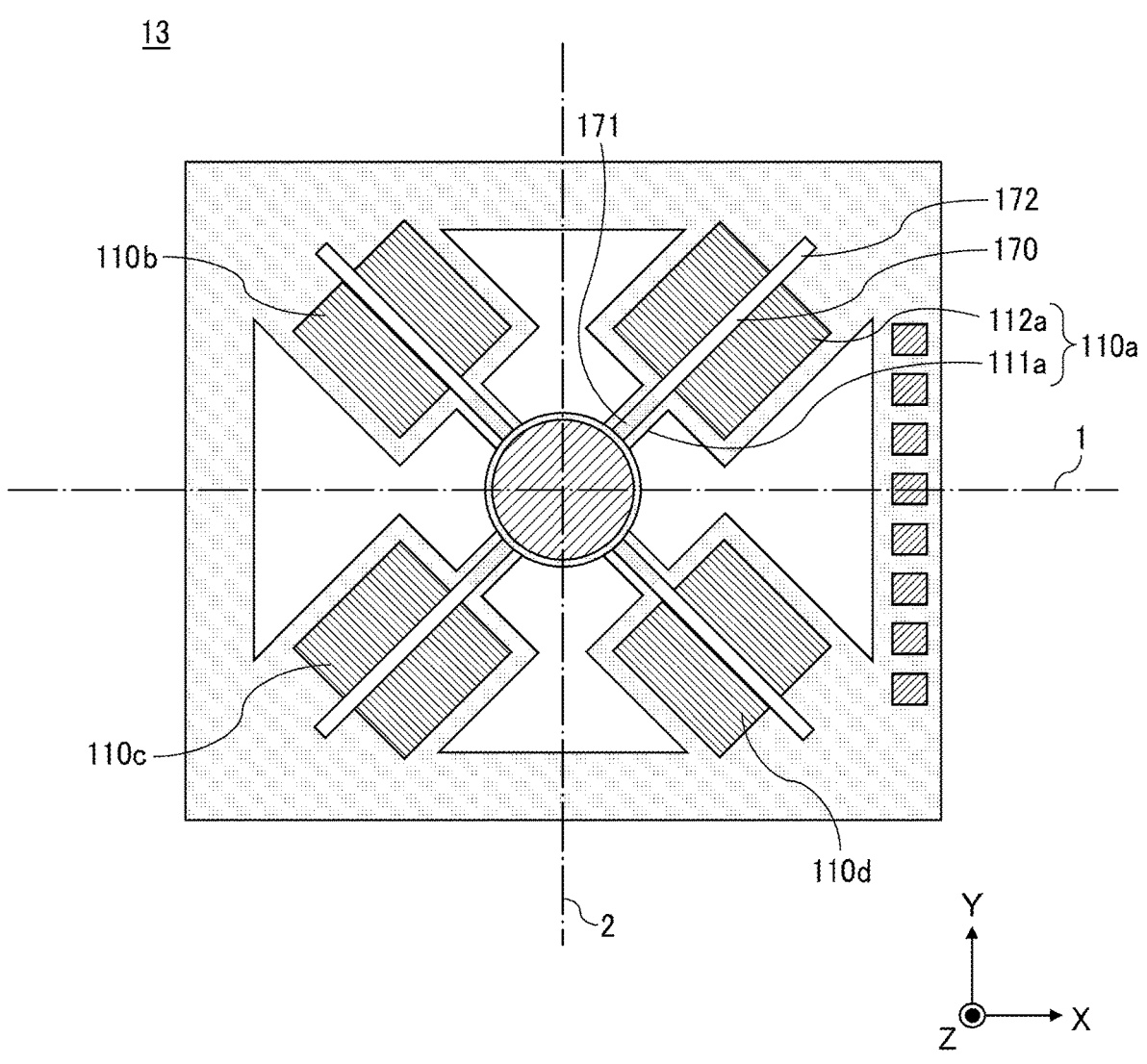
FIG. 16 is a diagram of a movable device with fully separated members according to a third modification of an embodiment of the present disclosure.

FIG. 16 is a diagram of a movable device according to a third modification of an embodiment of the present disclosure. In the present modification, the movable device includes a first opening 170 in the first drive unit 112a, a second opening 171 in the connection portion 111a, and a third opening 172 in a supporting portion 120. In other words, the supporting portion 120 has a still another opening (i.e., the third opening 172). The first opening 170, the second opening 171, and the third opening 172 are continuous with each other, which allows for the measurement of a higher deflection angle. In other words, the opening (i.e., the first opening 170) and the still another opening (i.e., the third opening 172) are continuous in the connection direction. The end of the opening as a whole (the first opening 170 and the second opening 171) that is continuous with the third opening 172 lies in the supporting portion 120. This causes a great stress on the supporting portion 120. However, the silicon support layer 161 in the supporting portion 120 enhances the mechanical strength of the movable device, providing high resistance to stress-induced damage.

This increases the reliability (i.e., the consistency of the movable device or an element to perform its intended function) more than a case in which the end of the opening is positioned in the silicon active layer 163.

Figure 17:
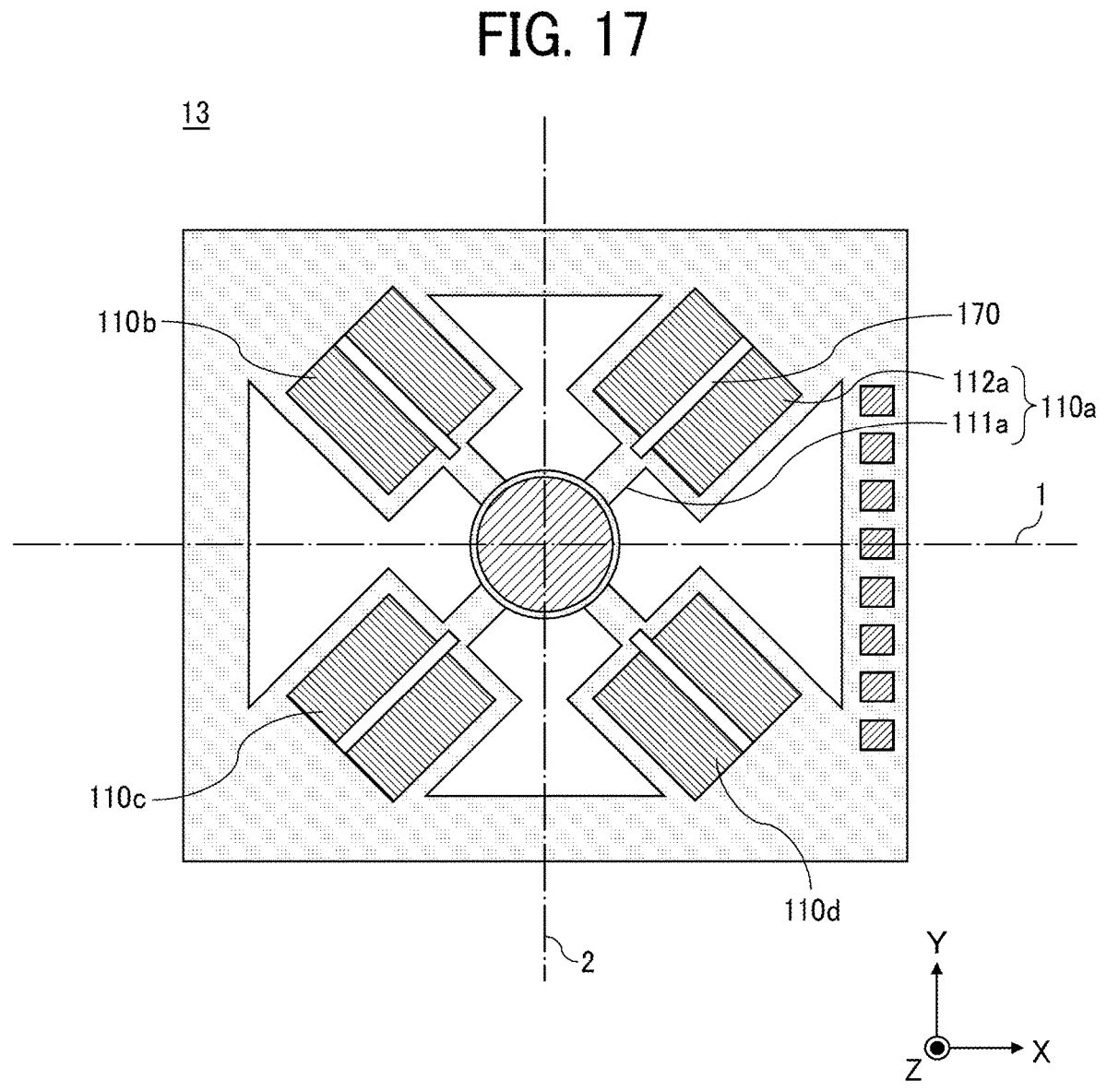

FIG. 17 is a diagram of a movable device according to a fourth modification of an embodiment of the present disclosure. In the present modification, the movable device includes a first opening 170 in a first drive unit 112a and a second opening 171 in a connection portion 111a. The second opening 171 is limited to a portion of the connection portion 111a, and most of the connection portion 111a is not divided into two. This enhances the strength of the connection portion 111a, providing resistance to damage and higher reliability.

FIG. 18 is a diagram of a movable device according to a fifth modification of an embodiment of the present disclosure. In the present modification, the movable device includes a first opening 170 in a first drive unit 112a. The first opening 170 is included in a part of the first drive unit 112a, allowing a higher deflection angle of the movable portion. Further, most of each of the first drive unit 112a and the connection portion 111a is not divided into two. This enhances the strength of the first drive unit 112a and the connection portion 111a, providing a movable device with resistance to damage and higher reliability.

The end of the first opening 170 is not preferably aligned with the ends of the upper electrode 203, the piezoelectric portion 202, and the lower electrode 201 of the drive unit. This prevents the stresses occurring at the end of the first opening 170 and the ends of the upper electrode 203, the piezoelectric portion 202, and the lower electrode 201 from intensifying together. However, aligning the end of the first opening with the ends of the upper electrode 203, the piezoelectric portion 202, and the lower electrode 201 increases ease in the formation process of the photolithography mask, allowing low-cost production.

FIG. 19 is a diagram of a movable device according to a sixth modification of an embodiment of the present disclosure. In the present modification, the movable device includes a first opening 170 in a first drive unit 112a and a second opening 171 in a connection portion 111a. The silicon active layer 163, which is a part of the connection portion 111a, lies between the first opening 170 and the second opening 171. The silicon active layer 163 between the first opening 170 and the second opening 171 prevents the first opening 170 and the second opening 171 from being continuous with each other. This provides a movable device with resistance to damage and higher reliability.

Figure 20:
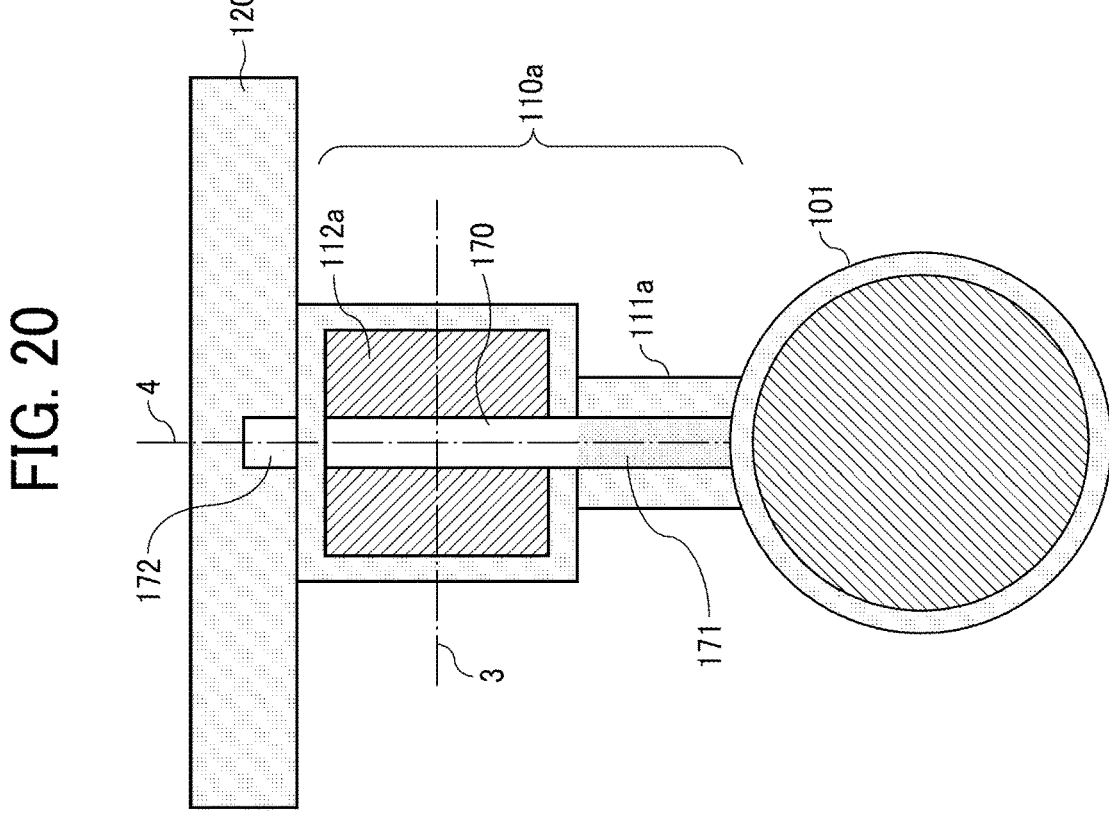
FIG. 20 is a diagram of a member with non-continuous openings according to a seventh modification of an embodiment of the present disclosure.

FIG. 20 is a diagram of a movable device according to a seventh modification of an embodiment of the present disclosure. In the present modification, the movable device includes a first opening 170 in the first drive unit 112a, a second opening 171 in the connection portion 111a, and a third opening 172 in a supporting portion 120. The third opening 172 passes through the silicon support layer 161, the silicon oxide layer, and the silicon active layer 163 in the supporting portion 120. The silicon active layer 163, which is a part of the supporting portion 120, lies between the first opening 170 and the third opening 172. The silicon active layer 163 between the first opening 170 and the third opening 172 disperses the stress generated around the third opening 172. This provides a movable device with the supporting portion 120 that offers increased resistance to mechanical damage and higher reliability.

Figure 21:
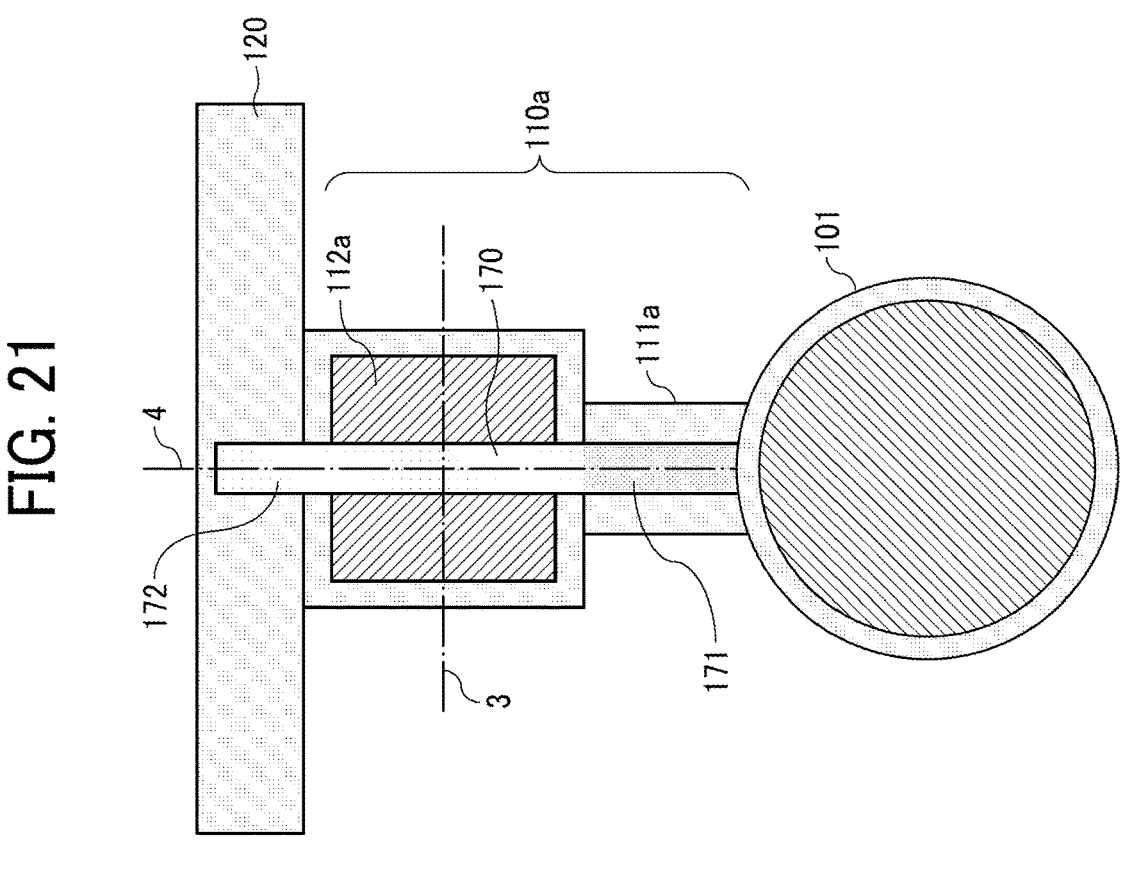
FIG. 21 is an enlarged view of the movable device with fully separated members according to the third modification in FIG. 16.

FIG. 21 is a diagram of a movable device according to the third modification of an embodiment of the present disclosure. In the present modification, the movable device includes a first opening 170 in the first drive unit 112a, a second opening 171 in the connection portion 111a, and a third opening 172 in a supporting portion 120. The first opening 170 and the third opening 172 are continuous with each other, and the first opening 170 and the second opening 171 are continuous with each other. This allows for the measurement of a higher deflection angle.

Figure 22:
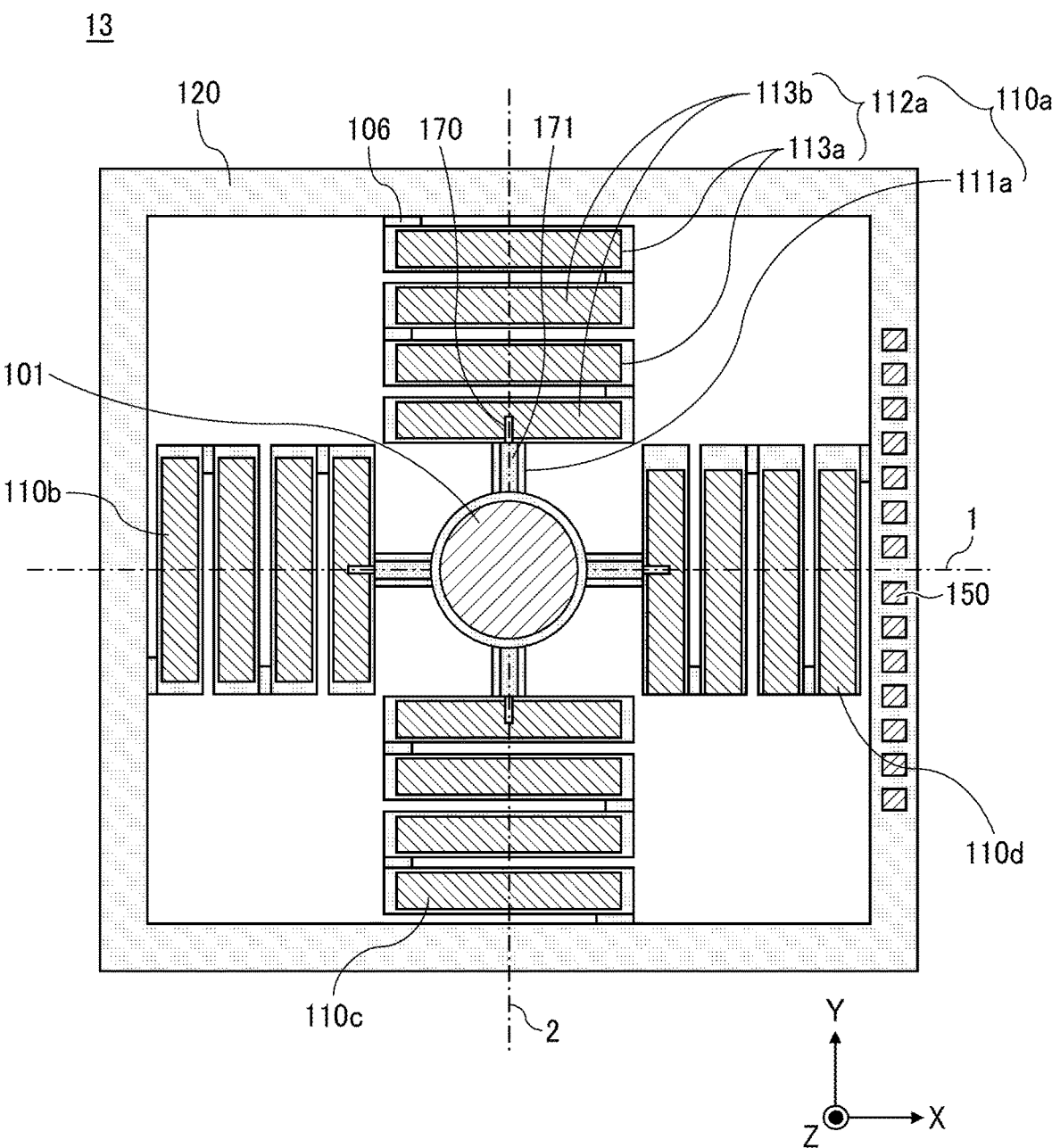
FIG. 22 is a diagram of a movable device with a point-symmetric meandering structure according to an eighth modification of an embodiment of the present disclosure.

FIG. 22 is a plan view of a movable device according to an eighth modification of an embodiment of the present disclosure. In a movable device of the present modification, a first drive unit 112a of a first member 110a has a meandering structure. The movable device includes a first opening 170 in a first drive unit 112a and a second opening 171 in a connection portion 111a. This applies to all the members 110a to 110d. In the meandering structure where multiple beams are connected in a zigzag pattern, piezoelectric drive unit group A 113a and piezoelectric drive unit group B 113b are alternately disposed the +Z-side surfaces of the beams, respectively. In such a configuration, the deflection angle of the mirror can be controlled in a positive direction or a negative direction without using negative voltage by driving the piezoelectric drive unit group A 113a alone (i.e., not driving the piezoelectric drive unit group B 113b). When out-phase-voltages are applied to the piezoelectric drive unit group A 113a and the piezoelectric drive unit group B 113b, respectively to switch the applied voltage signals in the time domain, a time delay in the signal switching between the piezoelectric drive unit group A 113a and the piezoelectric drive unit group B 113b is applied. This allows the generated mechanical vibrations to cancel each other out by being out of phase between the piezoelectric drive unit group A 113a and the piezoelectric drive unit group B 113b. This enables high-speed drawing and response to a complicated driving waveform. The first opening 170 and the second opening 171 in the meandering structure reduce the deformation of the connection portion 111a, that occurs when the members 110b and 110d adjacent to the first member 110a, increasing the deflection angle of the movable portion.

Figure 23:
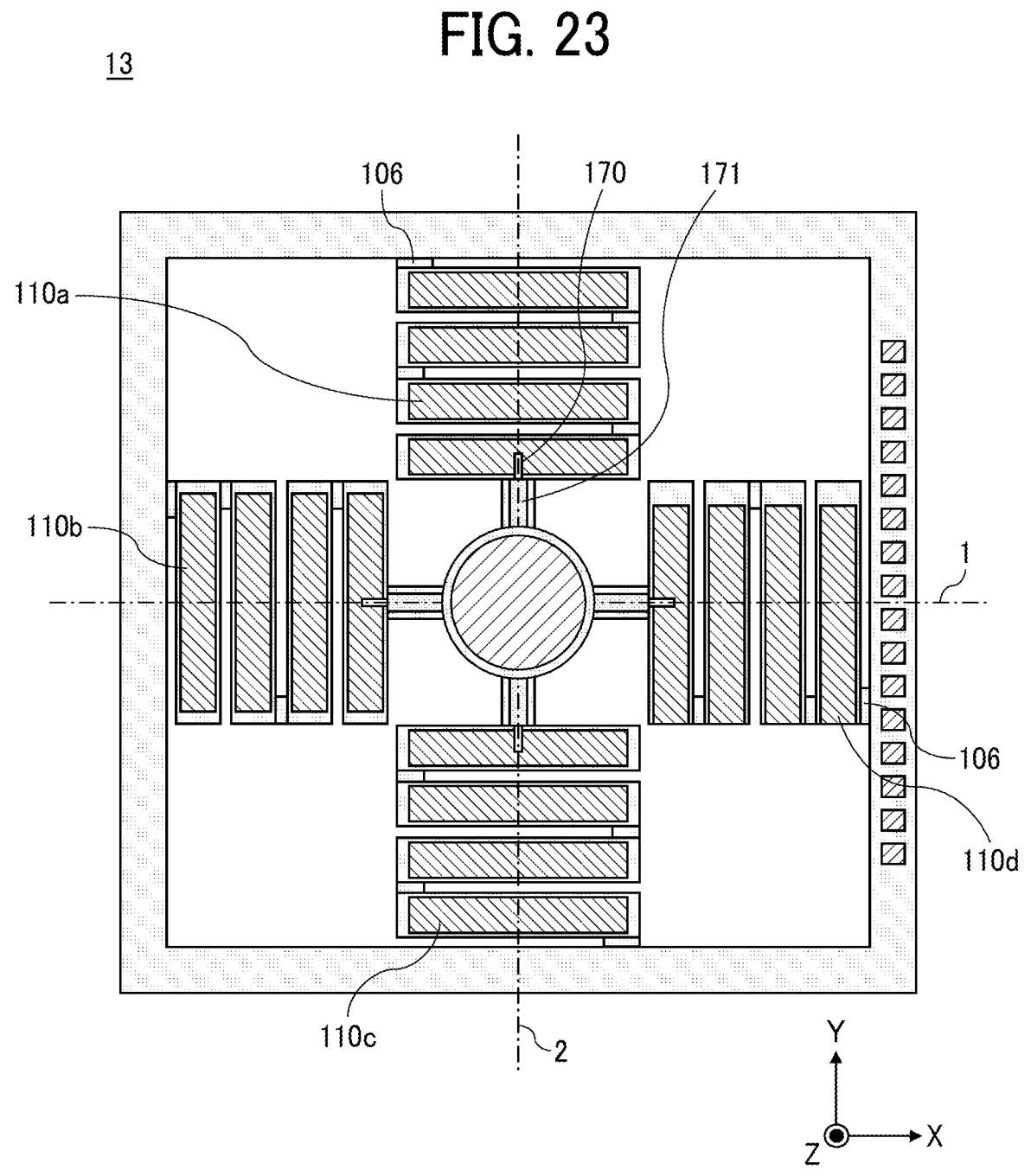

The arrangement of the meander structure with respect to the movable portion 101 may be a point symmetry arrangement as illustrated in FIG. 22 or a line symmetry arrangement as illustrated in FIG. 23. The arrangement determines how the drive units are combined in relation to the oscillation axes. The effect obtained by providing the first opening 170 can be obtained in either case. In some embodiments, the meandering structure includes a detector as a functional element other than the drive unit. Detailed configuration is not illustrated in the drawings of the embodiments. The number of the electrode connection portions 150 is not limited to those illustrated in the drawings.

The first member 110a with a cantilever structure enables a movable device that is resistant to disturbance vibration. The first member 110a with a meandering structure enables a movable device that can handle complicated drive signal control. When used for vector scanning, a cantilever structure that enhances the linearity of the scanning by increasing the resonant frequency is preferable to the meandering structure.

Figure 24:
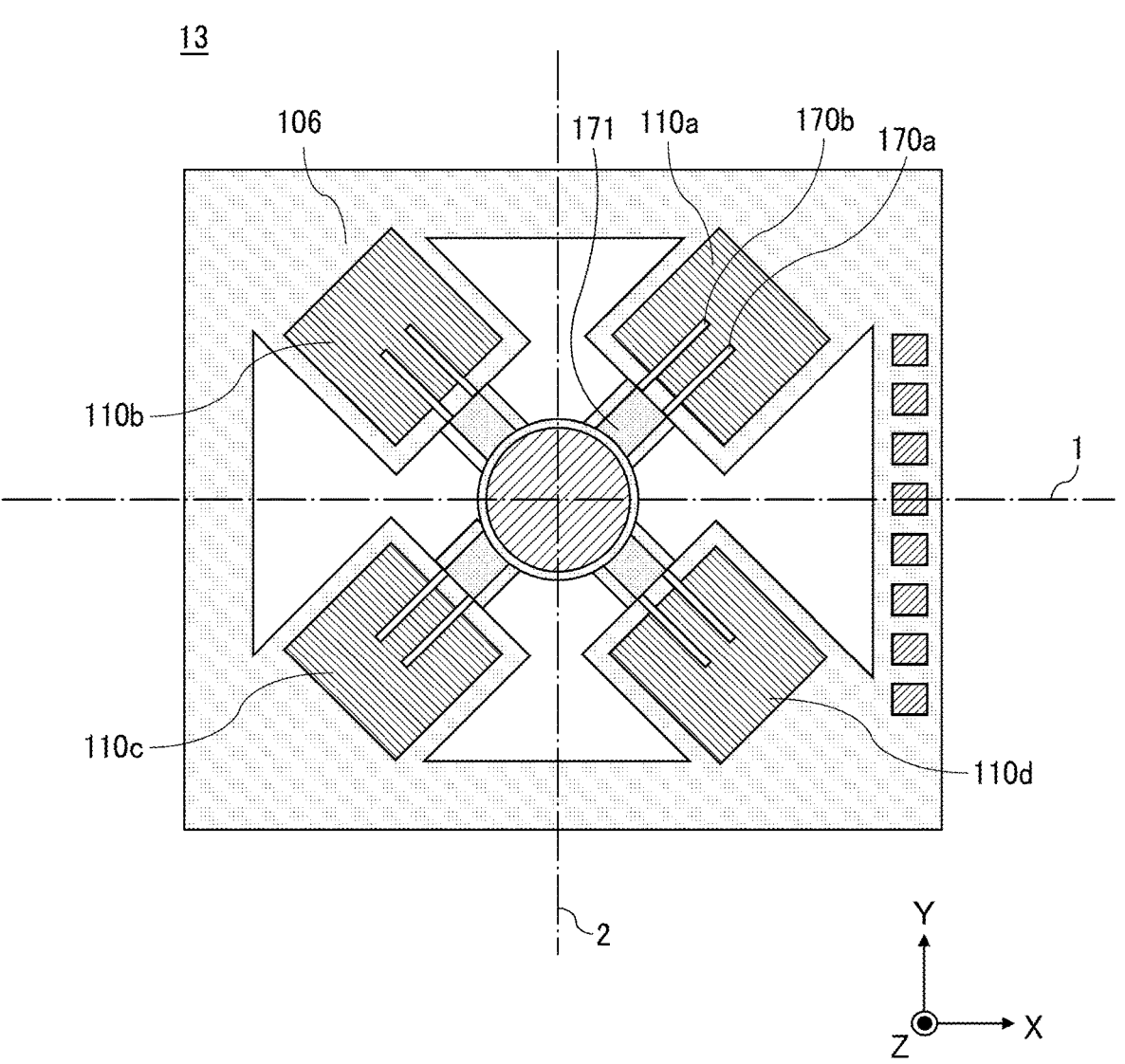
FIG. 24 is a diagram of a movable device with multiple openings according to a tenth modification of an embodiment of the present disclosure.

FIG. 24 is a plan view of a movable device according to a tenth modification of an embodiment of the present disclosure. In the tenth modification, multiple first openings 170a and 170b are arranged line-symmetrically with respect to a line that approximately or substantially bisects the drive unit 112a. In the movable device of the present modification, two first openings 170a and 170b are formed for one member 110a. Multiple first openings instead of one first opening also enables a higher deflection angle. Two or more openings (e.g., 170a, 170b) facilitate the oscillation of the movable portion and increases the mount of oscillation of the movable portion irrespective of the mutual constraints between the oscillations in the two vector directions.

In other words, the member (e.g., the first member 110a) according to the present modification has multiple openings (e.g., openings 170a and 170b). The multiple openings are symmetrical with respect to a line bisecting the drive unit (e.g., the first drive unit 112a) in the connection direction.

The two first openings 170a and 170b are arranged in line symmetry with respect to the line that approximately bisects the drive unit 112a in a plan view (YX plane) as illustrated in FIG. 24. This lowers the stiffness of the portion around the connection portion without changing the area of the drive unit 112a, thus increasing the amount of oscillation of the movable portion 101 around both the first rotation axis 1 and the second rotation axis 2. The detailed configuration of the member and the drive unit is not limited. In addition, a detailed configuration of the connection portion and the opening is not limited.

Figure 25:
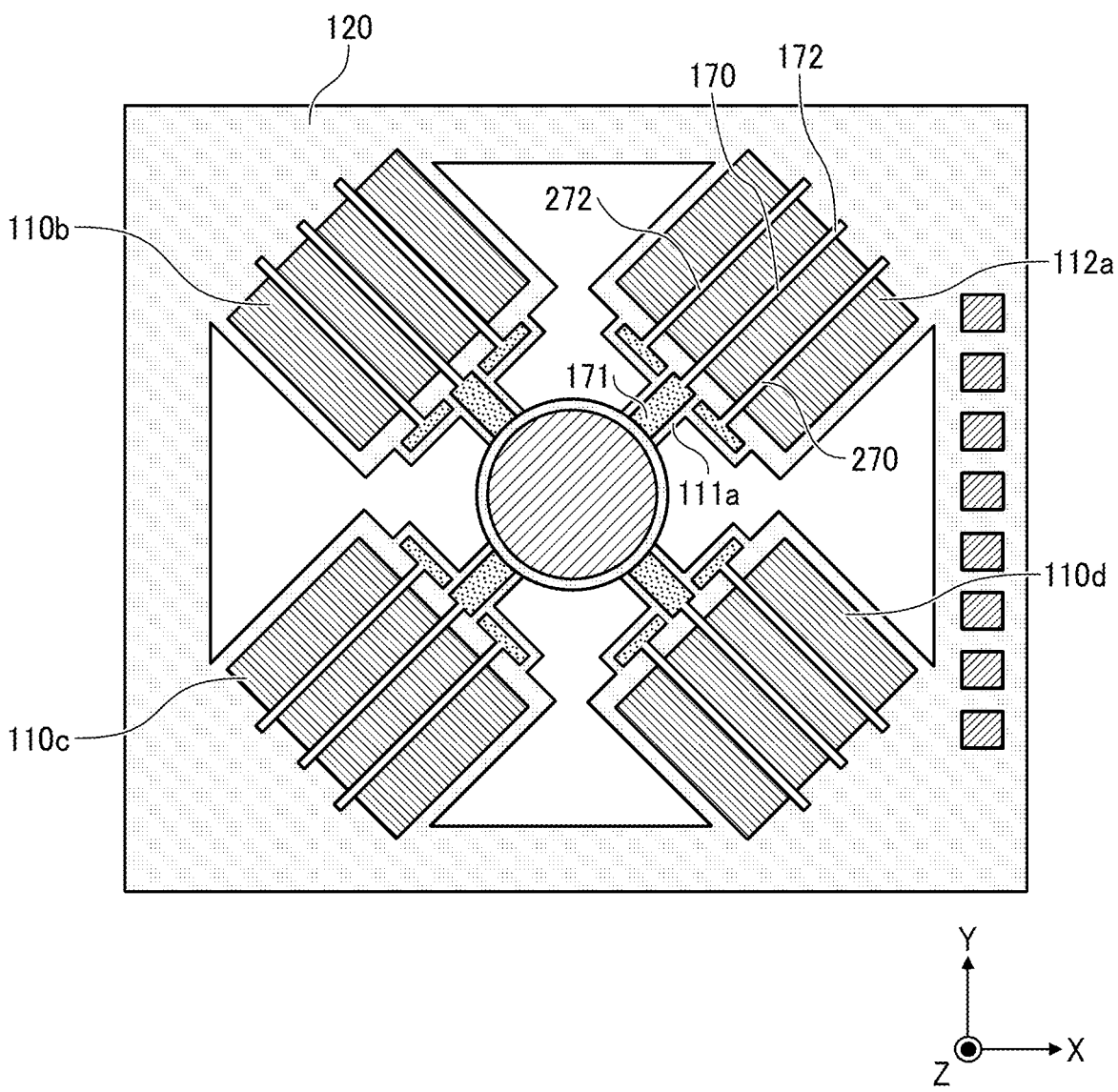
FIG. 25 is a diagram of a movable device with three openings according to an eleventh modification of an embodiment of the present disclosure.

FIG. 25 is a plan view of a movable device according to an eleventh modification of an embodiment of the present disclosure. In the eleventh modification, in addition to the first opening 170, a fourth opening 270 and a fifth opening 272 are formed in the first drive unit 112a. The first opening 170, the fourth opening 270, and the fifth opening 272 are all continuous with the supporting portion 120. The first opening 170, the fourth opening 270, and the fifth opening 272 have like second openings 172 positioned in the extension of the first opening 170, the fourth opening 270, and the fifth opening 272, respectively. The present medication lowers the stiffness of the portion around the connection portion 111a without changing the area of the drive unit 112a, thus increasing the amount of oscillation of the movable portion 101 around both the first rotation axis 1 and the second rotation axis 2.

Figure 26:
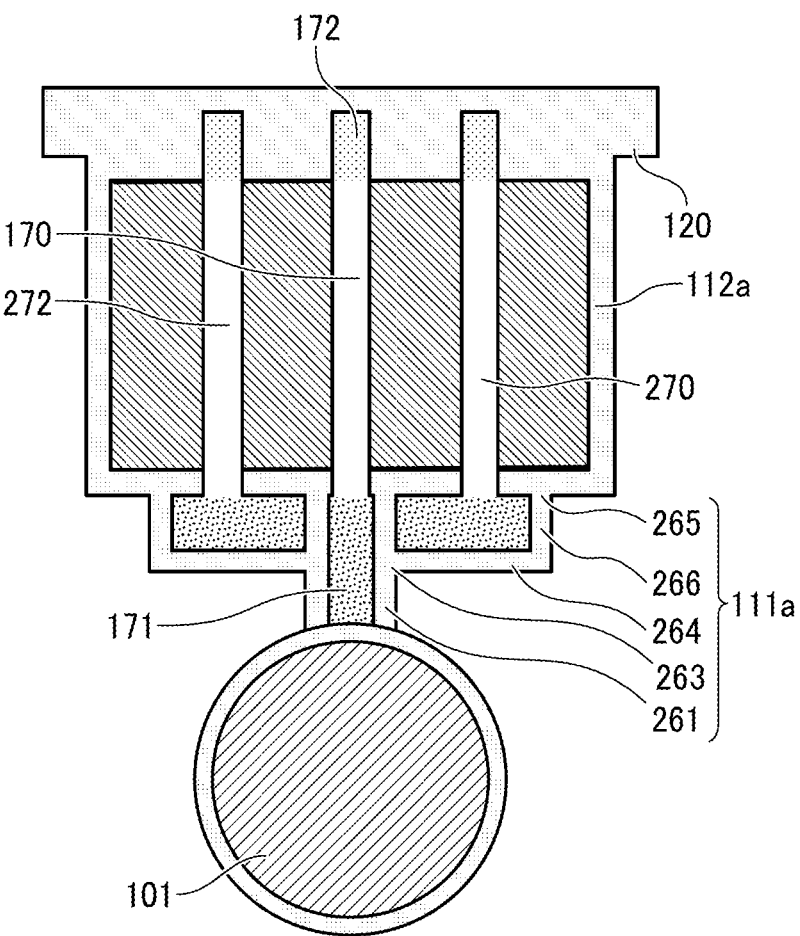
FIG. 26 is an enlarged view of the movable device according to the eleventh modification with three openings.

FIG. 26 is an enlarged view of a portion of the movable device in FIG. 25. As illustrated in FIG. 25, the connection portion 111a is branched off in a direction parallel to the longitudinal direction of the second opening 171. FIG. 25 indicates a connection site (e.g., 265) between the connection portion 111a and the first drive unit 112a; a meeting point 263 of the branched portions of the connection portion 111a; and another connection site between the movable portion 101 and the connection portion 111a. The distance between the connection site and the meeting point 263 is shorter than the distance between said another connection site and the meeting point 263. In other words, a connection portion 266 proximate to the drive unit 112a is shorter than a connection portion 261 proximate to the movable portion 101. As the distance between the meeting point 263 and the movable portion 101 increases, the driving force is transmitted to the movable portion 101 more effectively, increasing the amount of oscillation of the movable portion 101. Similarly to the modification with a narrow opening as illustrated in FIG. 8, the fourth opening 270 and the fifth opening 272 has a narrow width in the lateral direction perpendicular to the longitudinal direction. The connection site 265 of the connection portion 111a is farther from the center than the fifth opening 272 in the lateral direction (i.e., the width direction). In other words, the width of the connection portion 264 in the direction (i.e., the lateral direction) parallel to the opening width of the connection portion 111a is longer than the width of the opening 272 in the lateral direction. This configuration enables efficient transmission of the driving force to the movable portion. Detailed configurations of the members, the drive units, the connection portions, and the openings are not limited.

Figure 27:
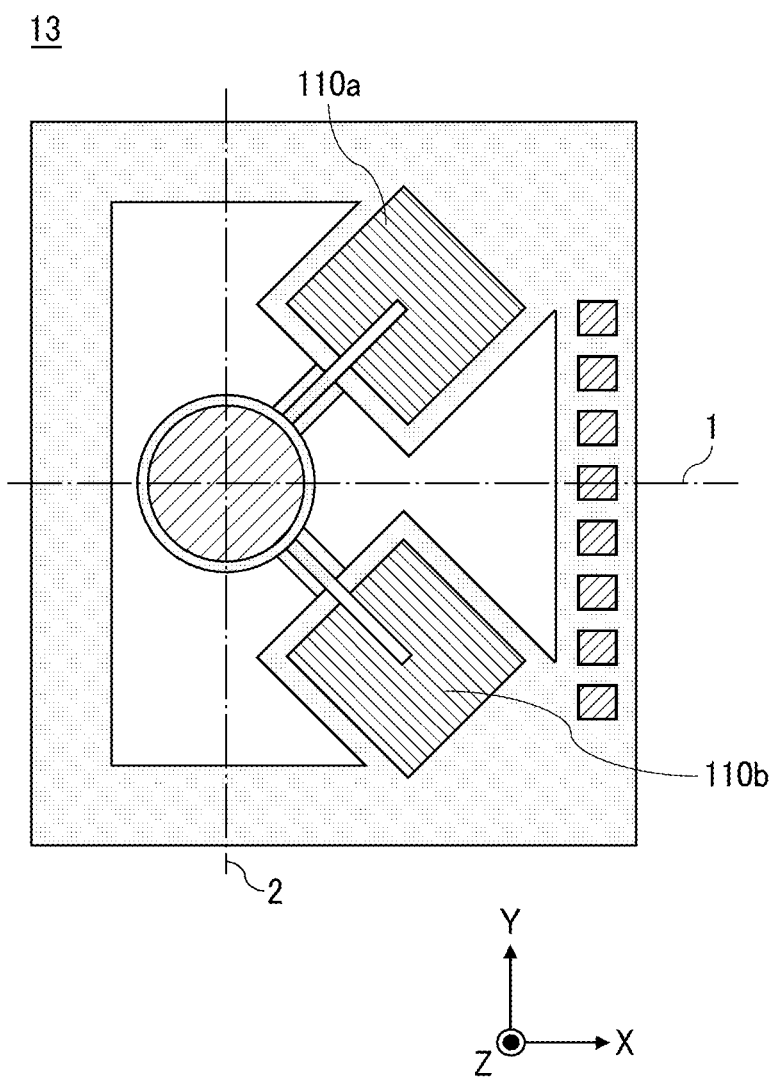
FIG. 27 is a diagram of a movable device with two drive units according to a twelve modification of an embodiment of the present disclosure.

FIG. 27 is a plan view of a movable device according to a twelfth modification of an embodiment of the present disclosure. In the present modification, the movable device includes two members: a first member 110a and a second member 110b. The first member 110a includes a first drive unit 112a, having one end connected to the supporting portion 120 and the other end connected to the movable portion 101. The second member 110b includes a second drive unit 112b, having one end connected to the supporting portion 120 and the other end connected to the movable portion 101. The movable portion 101 is oscillable (rotatable) about a first rotation axis 1 and a second rotation axis 2 intersecting with the first rotation axis 1. Each of the first member 110a and the second member 110b has an opening, which is a first opening formed in the drive unit. The present modification provides a movable device that is rotatable about both the first rotation axis 1 and the second rotation axis 2, which is caused by two members as illustrated in FIG. 27. In such a device, the first opening 170 enables a higher deflection angle. The detailed configuration of the member and the drive unit is not limited.

In addition, a detailed configuration of the connection portion and the opening is not limited.

Figure 28A:
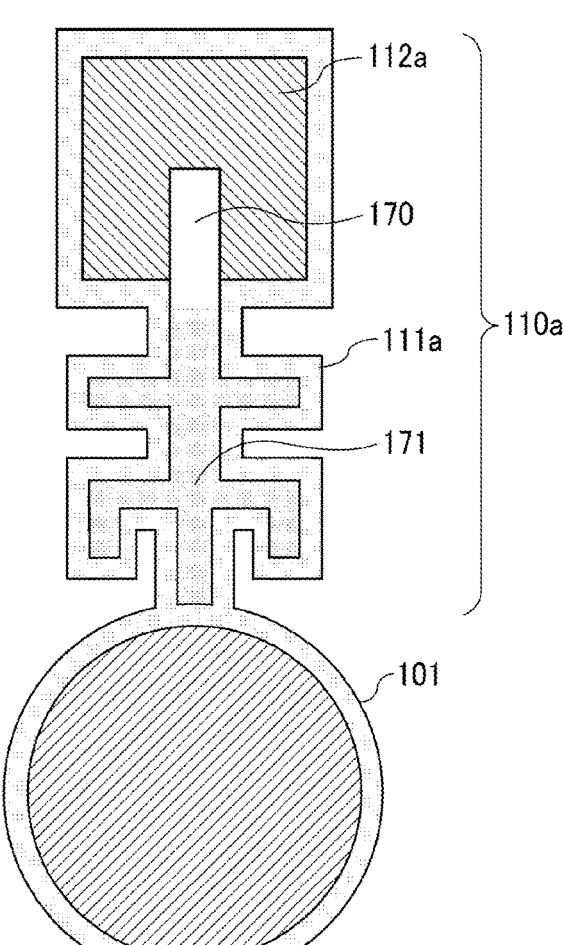
FIG. 28A is a diagram of a connection portion with a bellows structure according to an embodiment of the present disclosure.
Figure 28B:
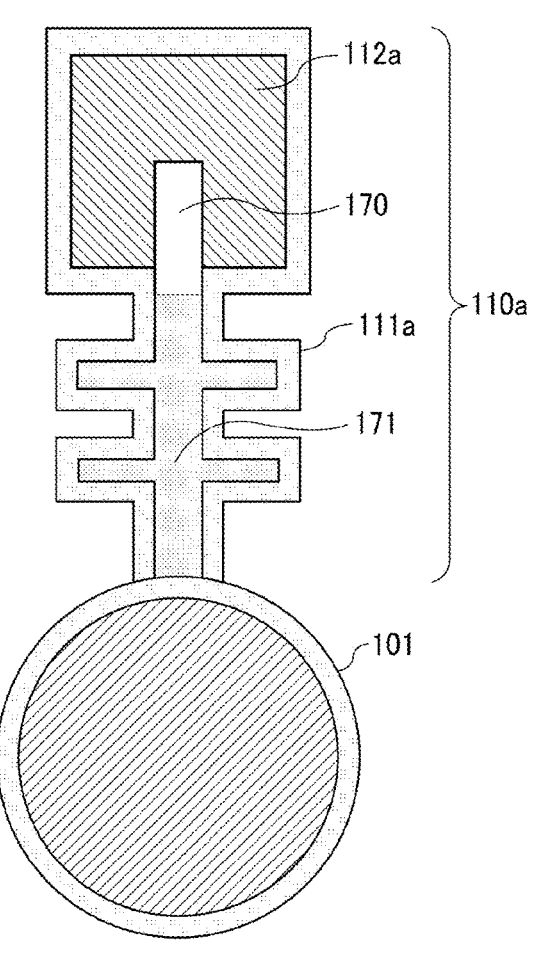
FIG. 28B is a diagram of a connection portion with a modified bellows structure according to a modification of the embodiment of the present disclosure in FIG. 28A.

FIGS. 28A and 28B are diagrams of connecting portions 111a according to modifications of an embodiment of the present disclosure. A second opening 171 in the connection portion 111a is branched off (e.g., bifurcated), and the connection portion 111a has a bellows structure. In FIG. 28A, the second opening 171 is multi-branched in the connection portion 111a of the member 110a connected to the movable portion 101.

Said another opening (i.e., the second opening 171) is bifurcated in the connection portion 111a.

The detailed shape and exact position of the connection portion 111a are not limited to those of the embodiments described above. However, since a longer connection portion 111a, i.e., a lower stiffness of the connection portion 111a enables a greater amount of oscillation of the movable portion 101, the second opening with the two-directional bellows structure as illustrated in FIG. 28A achieves a maximum oscillation amplitude of the movable portion 101. In the two-directional bellows structure, the two directions are intended to allow the movable portion 101 to oscillate around two orthogonal axes while tracing a two-dimensional path using the second opening 171. To reduce stiffness of the connection portions 111a in both directions, the bellows structure has branched portions folded in both directions. However, the shape of the connection portion is not limited to that of FIG. 28A. Examples of the shape of the connection portion include a uni-directional bellows structure, a two-directional bellows structure with the two directions not orthogonal to each other, and three-or-more directional bellows structure, which all exhibit the effects of the present modification. Detailed configurations of the connection portion and the opening are not limited.

Figures 29, 30:
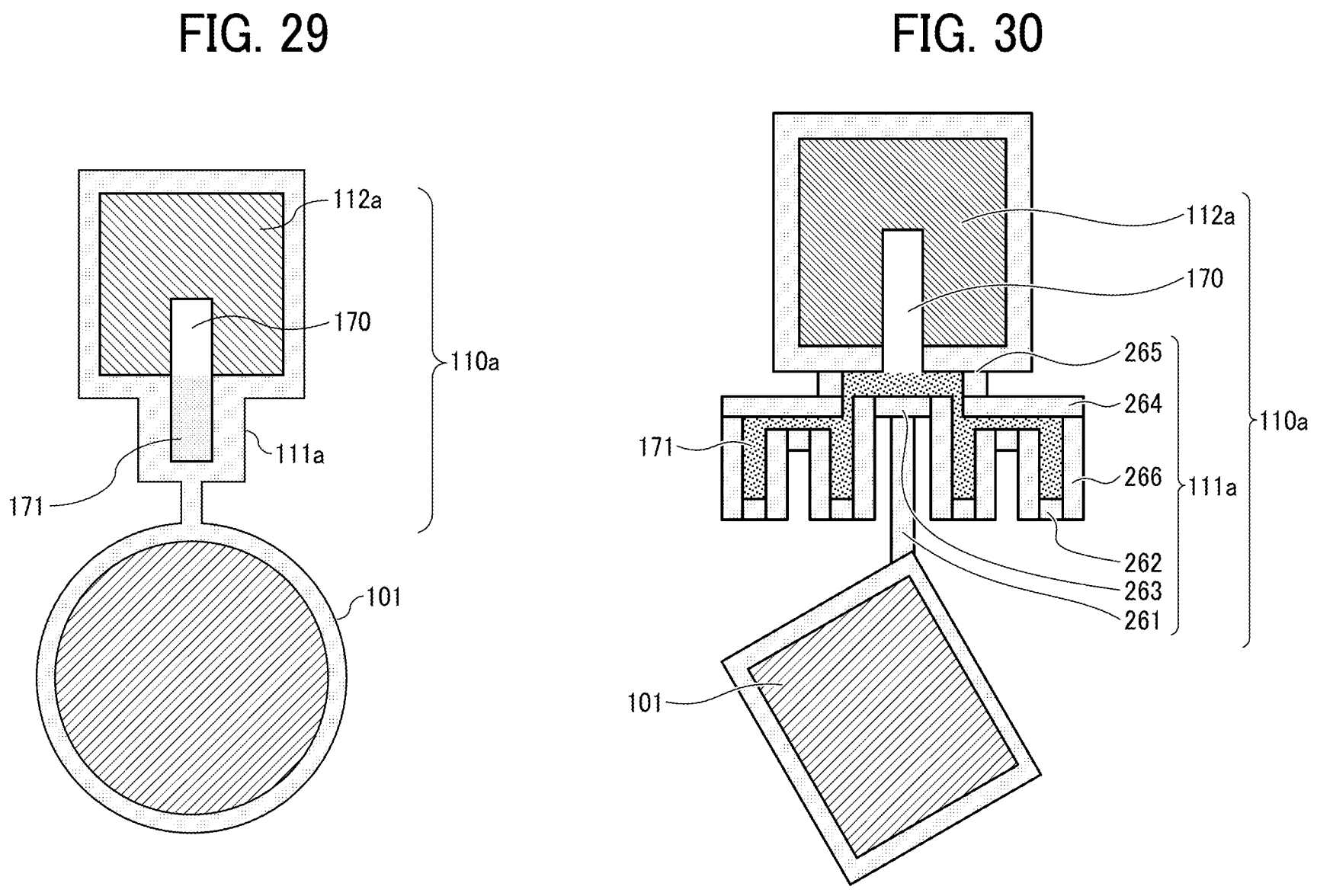

FIG. 29 is a graph of a connecting portion according to a modification of an embodiment of the present disclosure. In the present modification, a first member 110a includes a connecting portion 111a connected to a movable portion 101. The connection portion 111a includes a second opening 171 having its end within the connection portion 111a. The connection portion 111a is partly divided into two by the second opening 171. The divided portions of the connection portion 111a meet at the end of the movable portion 101. The divided portions of the connection portion 111a (i.e., the end of the connection portion 111a closer to the movable portion 101) are unified, preventing or reducing concentration of stress at a connection site between the movable portion 101 and the connection portion 111a. This increases the stiffness and prevents damage during oscillation and manufacturing.

FIG. 30 is a diagram of a movable portion 101 according to a thirteenth modification of an embodiment of the present disclosure. In the thirteenth modification, the movable portion 101 has a rectangular shape. In this case, the movable portion 101 is connected to the connection portion 111a at one connection site, at which the connection portion 111a is unified, because multiple connection portions used for supporting the movable portion 101 lead to an imbalance in the transmission of driving force. Preferably, the connection portion 111a has a folded structure, which lowers the stiffness and increases the oscillation amplitude of the movable portion. Preferably, the position (the meeting point 263) at which multiple connection portions are unified is closer to the drive unit 112a than the movable portion 101 to more effectively transmit the driving force to the movable portion 101.

Figure 31:
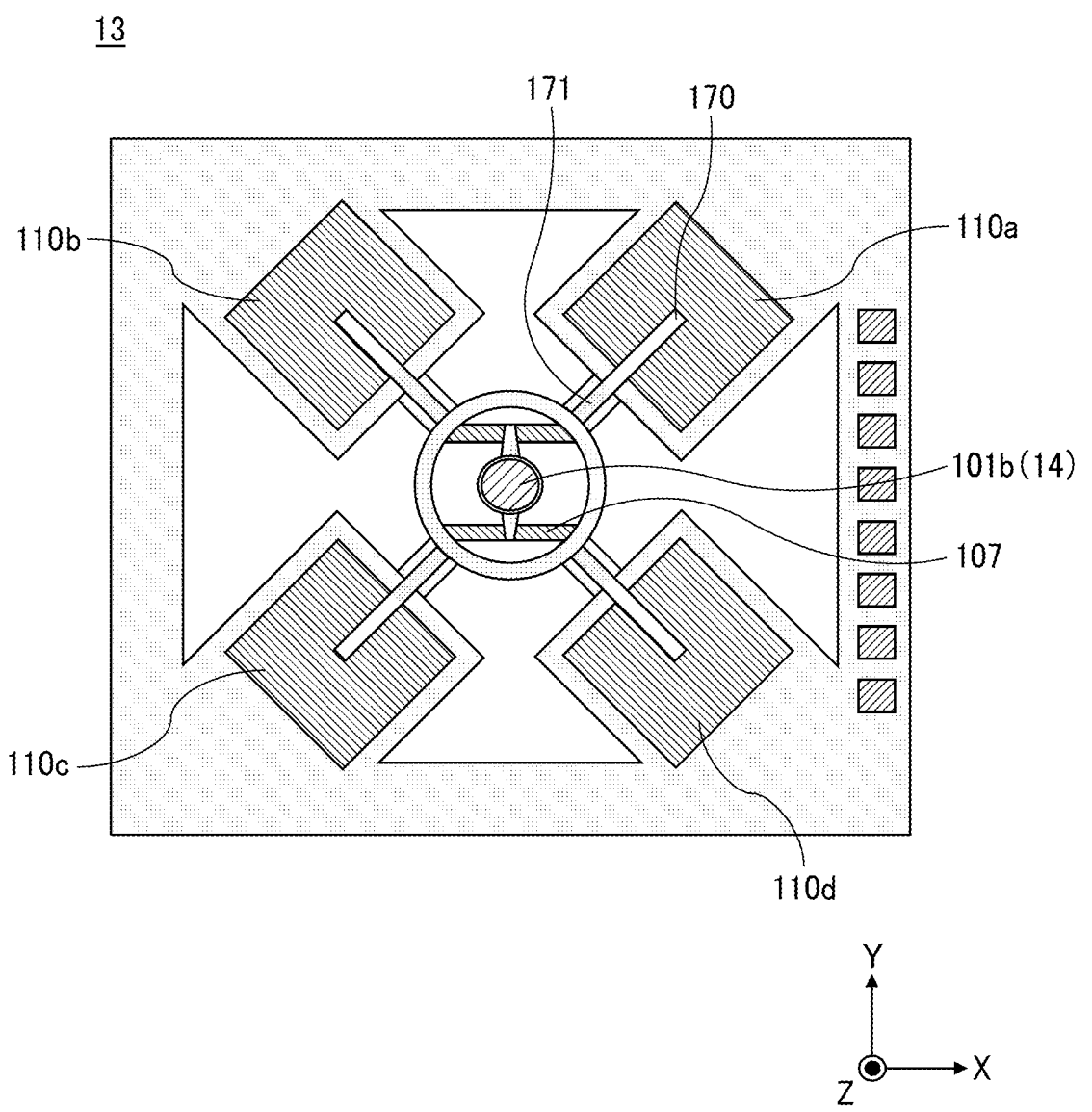
FIG. 31 is an illustration of a movable device including another drive unit within a movable portion, according to a fourteenth modification of an embodiment of the present disclosure.

FIG. 31 is a plan view of a movable device according to a fourteenth modification of an embodiment of the present disclosure. In the fourteenth modification, the movable device includes a fifth drive unit 107 in addition to the first drive unit, the second drive unit, the third drive unit, and the fourth drive unit, which drive the movable device 101a. The fifth drive unit 107 allows another movable portion 101b (reflecting surface 14) to be independently driven. This configuration allows an oscillation of the movable portion 101a by the first drive unit, the second drive unit, the third drive unit, and the fourth drive unit and also an oscillation of the movable portion 101b by the fifth drive unit 107. Thus, a much greater oscillation angle can be obtained. This enables switching of the reference direction and the scanning range of the movable portion 101b (the reflecting surface 14). A detailed configuration of the fifth driving unit 107 included in the movable portion 101a and the movable portion 101b is not limited. Other functional elements may be mounted in the movable device according to the fourteenth modification.

Embodiments incorporating the movable device according to an embodiment of the present disclosure are described below.

Optical Scanning System

An optical scanning system incorporating the movable device according to an embodiment of the present disclosure is described in detail with reference to FIGS. 32 to 35.

Figure 32:
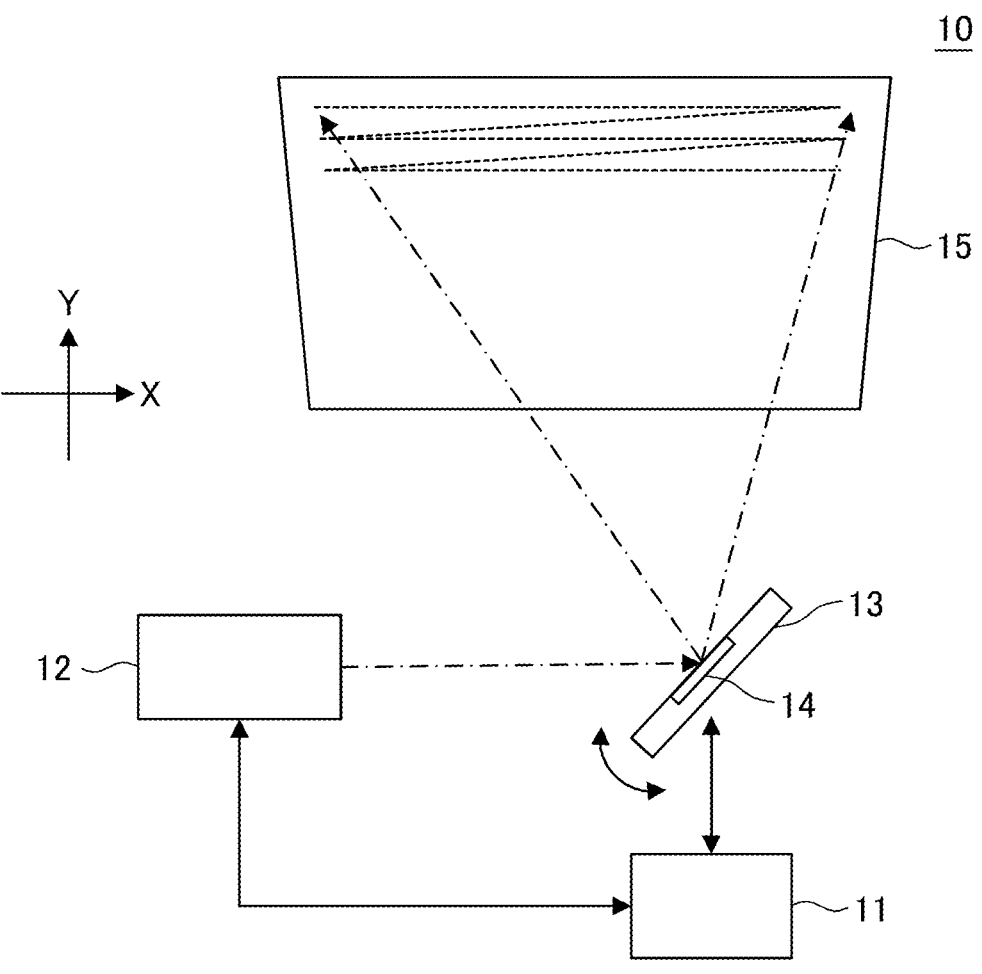
FIG. 32 is a schematic view of an optical scanning system according to an embodiment of the present disclosure.

FIG. 32 is a diagram of an optical scanning system 10 according to an embodiment of the present disclosure. As illustrated in FIG. 32, the optical scanning system 10 deflects light emitted from a light-source device 12 under the control of a control device 11, by using a reflecting surface 14 included in the movable device 13, so as to optically scan a target surface 15 to be scanned (hereinafter, referred to as target surface).

The optical scanning system 10 includes the control device 11, the light-source device 12, and the movable device 13 including the reflecting surface 14.

For example, the control device 11 is an electronic circuit unit provided with a central processing unit (CPU) and a field-programmable gate array (FPGA). For example, the movable device 13 is provided with a reflecting surface 14, and the movable device 13 serves as a micro-electromechanical system (MEMS) that moves the reflecting surface 14. The light-source device 12 is, for example, a laser device that emits a laser beam. The target surface 15 is, for example, a screen.

The control device 11 generates control instructions of the light-source device 12 and the movable device 13 based on acquired optical-scanning information, and outputs drive signals to the light-source device 12 and the movable device 13 based on the control instructions.

The light-source device 12 emits light based on the received drive signal. The movable device 13 moves the reflecting surface 14 in at least one of a uniaxial direction and a biaxial direction, based on the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device and the details of the control of the control device according to the embodiment are described later.

Figures 33, 34:
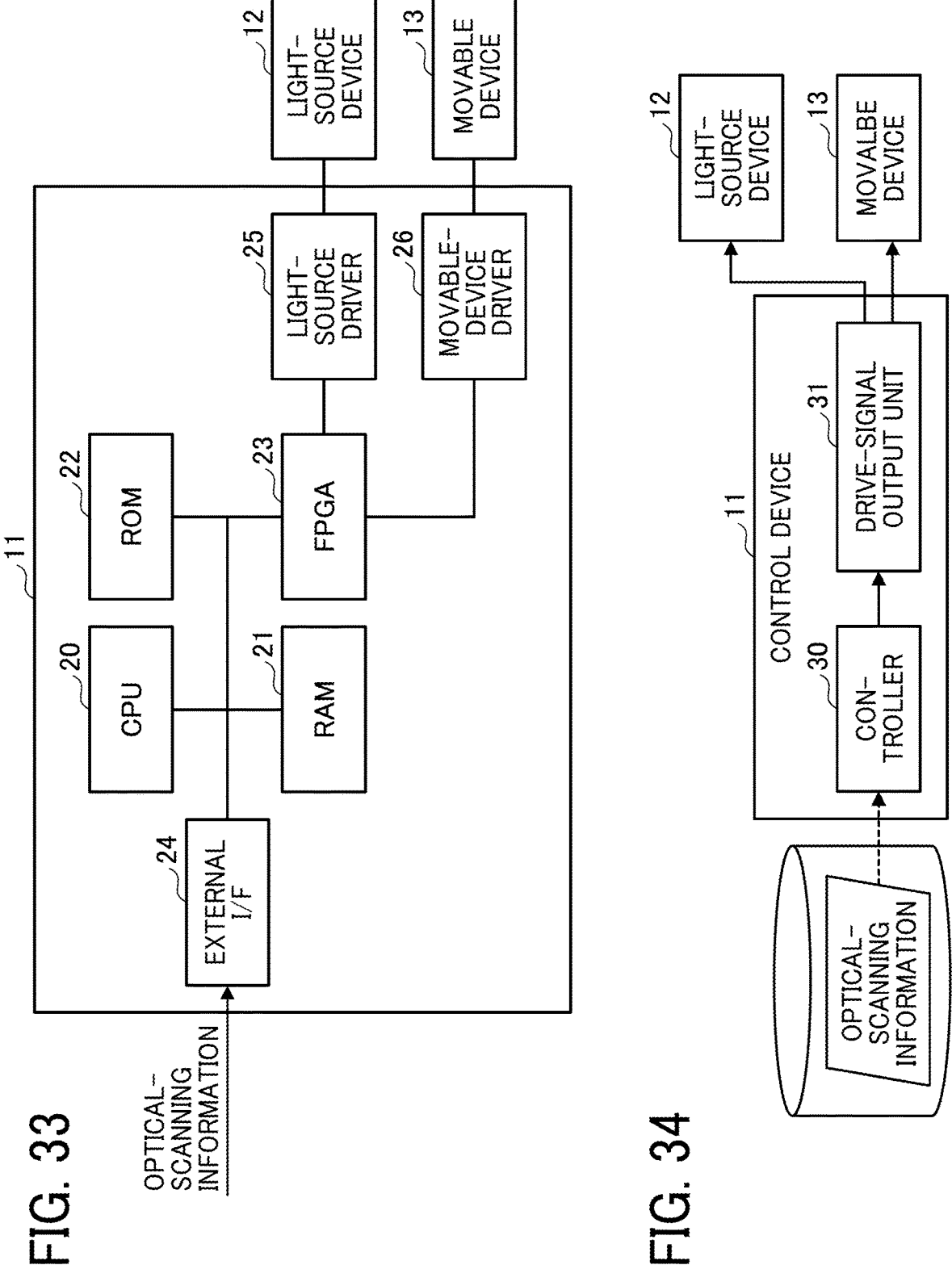
FIG. 33 is a block diagram of a hardware configuration of the optical scanning system in FIG. 32, according to an embodiment of the present disclosure.
FIG. 34 is a block diagram of a functional configuration of a control device according to an embodiment of the present disclosure.

Referring now to FIG. 33, a hardware configuration of the optical scanning system is described below.

As illustrated in FIG. 33, the optical scanning system 10 includes the control device 11, the light-source device 12, and the movable device 13, which are electrically connected to one another. The control device 11 includes a central processing unit (CPU) 20, a random access memory (RAM) 21, a read only memory (ROM) 22, a field-programmable gate array (FPGA) 23, an external interface (I/F) 24, a light-source driver 25, and a movable-device driver 26.

The CPU 20 is an arithmetic device that loads into the RAM 21a program or data from a storage device such as the ROM 22 and executes processing to provide the controls or functions of the entirety of the control device 11.

The RAM 21 is a volatile storage device that temporarily holds a program and data.

The ROM 22 is a non-volatile storage device that can hold a program and data even after the power is turned off, and stores a program and data for processing that is executed by the CPU 20 to control each function of the optical scanning system 10.

The FPGA 23 is a circuit that outputs proper control signals to the light-source driver and the movable-device driver 26 in accordance with the processing performed by the CPU 20.

For example, the external I/F 24 is an interface with respect to an external device or a network. The external device may be, for example, a host device such as a personal computer (PC); or a storage device, such as a universal serial bus (USB) memory, a secure digital (SD) card, a compact disk (CD), a digital versatile disk (DVD), a hard disk drive (HDD), or a solid state drive (SSD). For example, the network may be a controller area network (CAN) of a vehicle, a local area network (LAN), and the Internet. The external I/F 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or a network through the external I/F 24. As far as the CPU 20 can acquire the optical-scanning information, the optical-scanning information is stored in the ROM 22 or the FPGA 23 in the control device 11. Alternatively, a storage device such as an SSD is additionally included in the control device 11 and the optical-scanning information is stored in the storage device.

In this case, the optical-scanning information indicates how the surface 15 is to be optically scanned. In another example, the optical-scanning information is image data used for optical scanning to display an image. For another example, the optical-scanning information is writing data indicating the order and portion of writing when optical writing is performed by optical scanning. Furthermore, for example, the optical scanning information is irradiation data indicating the time and range of irradiation of light for object recognition in a case where an object is to be recognized by optical scanning.

The control device 11 can provide the functional configuration described below by using instructions from the CPU 20 and the hardware configuration illustrated in FIG. 33.

The functional configuration of the control device 11 of the optical scanning system 10 is described below referring to FIG. 34. FIG. 34 is a functional block diagram of the control device 11 of the optical scanning system 10 according to an embodiment of the present disclosure.

As illustrated in FIG. 34, the control device 11 includes a controller 30 and a drive-signal output unit 31 as functions.

The controller 30 is implemented by, for example, the CPU 20 and the FPGA 23. The controller 30 acquires optical-scanning information from an external device, converts the optical-scanning information into a control signal, and outputs the control signal to the drive-signal output unit 31. For example, the controller 30 acquires image data serving as the optical-scanning information from an external device, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 in accordance with the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal of the movable device 13 is a drive voltage used to control the timing at which the reflecting surface 14 included in the movable device 13 is moved and the movable range of the reflecting surface 14.

Figure 35:
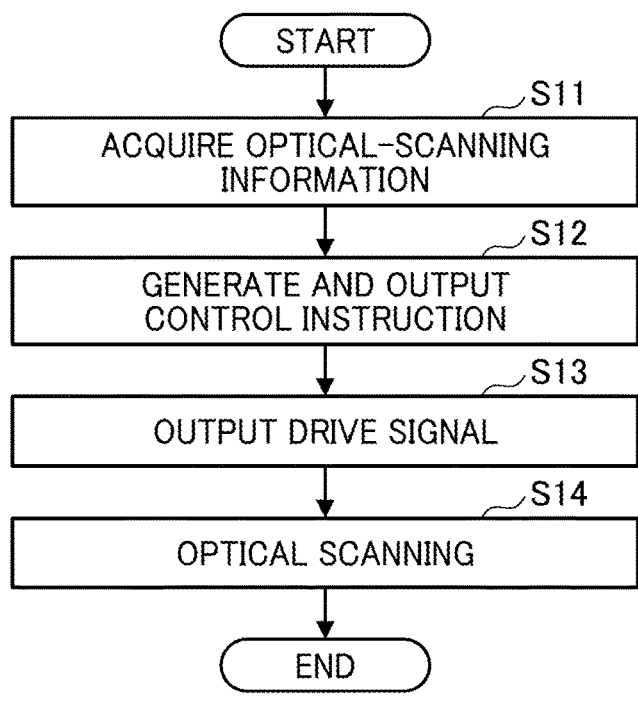
FIG. 35 is a flowchart of processing performed by the optical scanning system, according to an embodiment of the present disclosure.

The process of optically scanning the target surface 15 performed by the optical scanning system 10 is described referring to FIG. 35. FIG. 35 is a flowchart of processing performed by the optical scanning system 10 according to an embodiment of the present disclosure.

In step S11, the controller 30 acquires optical-scanning information from, for example, an external device.

In step S12, the controller 30 generates control signals from the acquired optical-scanning information, and outputs the control signals to the drive-signal output unit 31.

In step S13, the drive-signal output unit 31 outputs drive signals to the light-source device 12 and the movable device 13 based on the received control signals.

In step S14, the light-source device 12 emits light based on the received drive signal. In addition, the movable device 13 moves the reflecting surface 14 based on the received drive signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions are implemented by separate elements. For example, a drive-signal output device including a drive-signal output unit 31 is included in addition to the control device 11 including the controller 30. An optical deflection system that performs optical deflection may be configured by the control device 11 and the movable device 13 provided with the reflecting surface 14, which are elements of the above optical scanning system 10.

Image Projection Apparatus

An image projection apparatus incorporating a movable device according to at least one embodiment is described in detail with reference to FIGS. 36 and 37.

Figure 36:
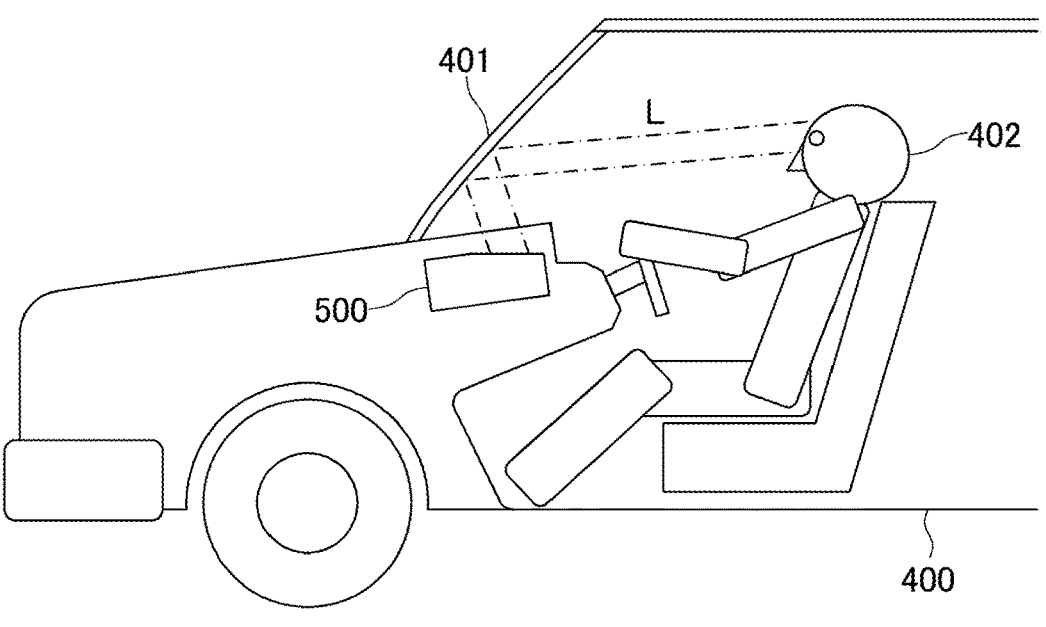
FIG. 36 is a schematic view of a vehicle equipped with a HUD according to an embodiment of the present disclosure.

FIG. 36 is a schematic view of a vehicle 400 equipped with a HUD 500 serving as an image projection apparatus, or a projection apparatus according to the embodiment. FIG. 37 is a schematic view of the HUD 500 according to an embodiment of the present disclosure.

The image projection apparatus is an apparatus that projects an image by optical scanning, and is, for example, a HUD.

As illustrated in FIG. 36, for example, the HUD 500 is disposed, for example, near a windshield 401 of the vehicle 400. Projection light L that is emitted from the HUD 500 is reflected by the windshield 401 and directed to a viewer (a driver 402) as a user. Accordingly, the driver 402 can visually recognize an image projected by the HUD 500, as a virtual image.

Alternatively, a combiner may be disposed on the inner wall surface of the windshield 401 so that the user can visually recognize a virtual image formed by the projection light that is reflected by the combiner.

Figure 37:
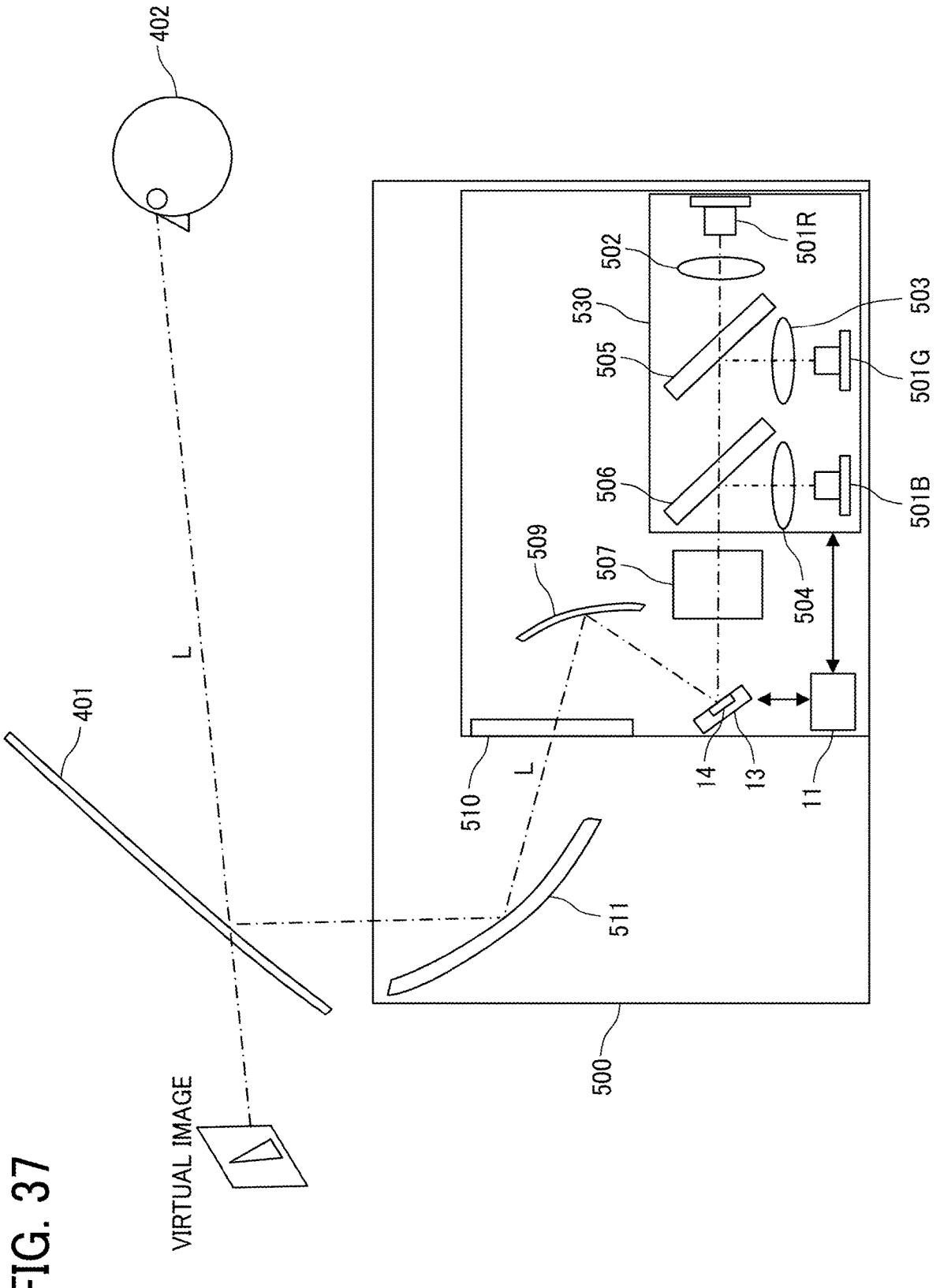
FIG. 37 is a schematic view of a HUD according to an embodiment of the present disclosure.

As illustrated in FIG. 37, the HUD 500 emits laser beams having different wavelengths from red, green, and blue laser-beam sources 501R, 501G, and 501B (multiple light sources of a light source unit of the HUD 500), respectively. The emitted laser beams pass through an incident optical system, and then are deflected by the movable device 13 including the reflecting surface 14. The incidence optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system and are projected onto a screen. The projection optical system (an optical system, of the image projection apparatus) includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530 (a light source unit of the HUD 500).

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. The light intensity of the combined laser beams is adjusted by the light-intensity adjuster 507, before being deflected for two-dimensionally scanning by the movable device 13 including the reflecting surface 14. The light L being deflected for two-dimensional scanning by the movable device 13 is reflected by the free-form surface mirror 509 and has its distortion corrected, thus being condensed on the intermediate screen 510. The intermediate screen 510 includes a microlens array in which microlenses are two-dimensionally arranged, and enlarges the projection light L incident on the intermediate screen 510 in units of microlens.

The movable device 13 causes the reflecting surface 14 to biaxially reciprocate and two-dimensionally scan with the light L incident on the reflecting surface 14. The movable device 13 is controlled in synchronization with the light-emitting timing of the laser-beam sources 501R, 501G, and 501B.

The HUD 500 is described above as the image projection apparatus. However, no limitation is indicated thereby, and the image projection apparatus may be any apparatus that performs optical scanning, using the movable device 13 including the reflecting surface 14, to project an image. For example, the present disclosure is also applicable to a projector that is placed on a desk and projects an image on a display screen, a head-mounted display device that is incorporated in a wearable member on the head of the observer, for example, and that projects an image on a reflective-and-transmissive screen of the wearable member or on an eyeball as a screen.

The image projection apparatus may be incorporated in, not only the vehicle or the wearable member, but also, for example, a mobile body such as an aircraft, a ship, or a mobile robot; or an immobile body such as an operation robot that operates a driving target such as a manipulator without moving from the installed location.

The HUD 500 serves as the "head-up display" described in the claims. The vehicle 400 serves as the "vehicle" recited in the claims.

Optical Writing Apparatus

An optical writing apparatus incorporating the movable device 13 according to an embodiment of the present disclosure is described in detail below with reference to FIGS. 38 and 39.

Figure 38:
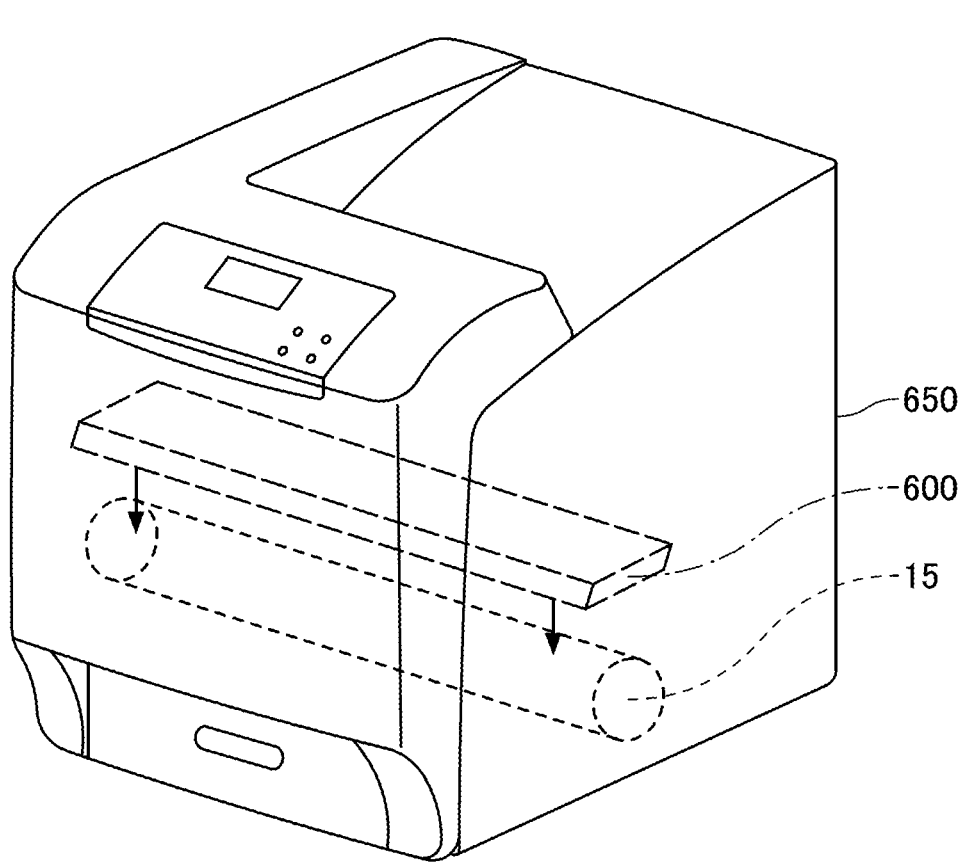
FIG. 38 is a schematic view of an image forming apparatus incorporating an optical writing apparatus according to an embodiment of the present disclosure.

FIG. 38 is a diagram of an image forming apparatus incorporating an optical writing apparatus 600 according to an embodiment of the present disclosure. FIG. 39 is a schematic view of the optical writing apparatus 600 according to an embodiment of the present disclosure.

As illustrated in FIG. 38, the optical writing apparatus 600 is used as a component of an image forming apparatus typified by a laser printer 650, for example, having printer functions using laser beams. In the image forming apparatus, the optical writing apparatus 600 performs optical scanning on a photoconductor drum, which is the target surface 15, by using one or more laser beams, thereby performing optical writing on the photoconductor drum.

Figure 39:
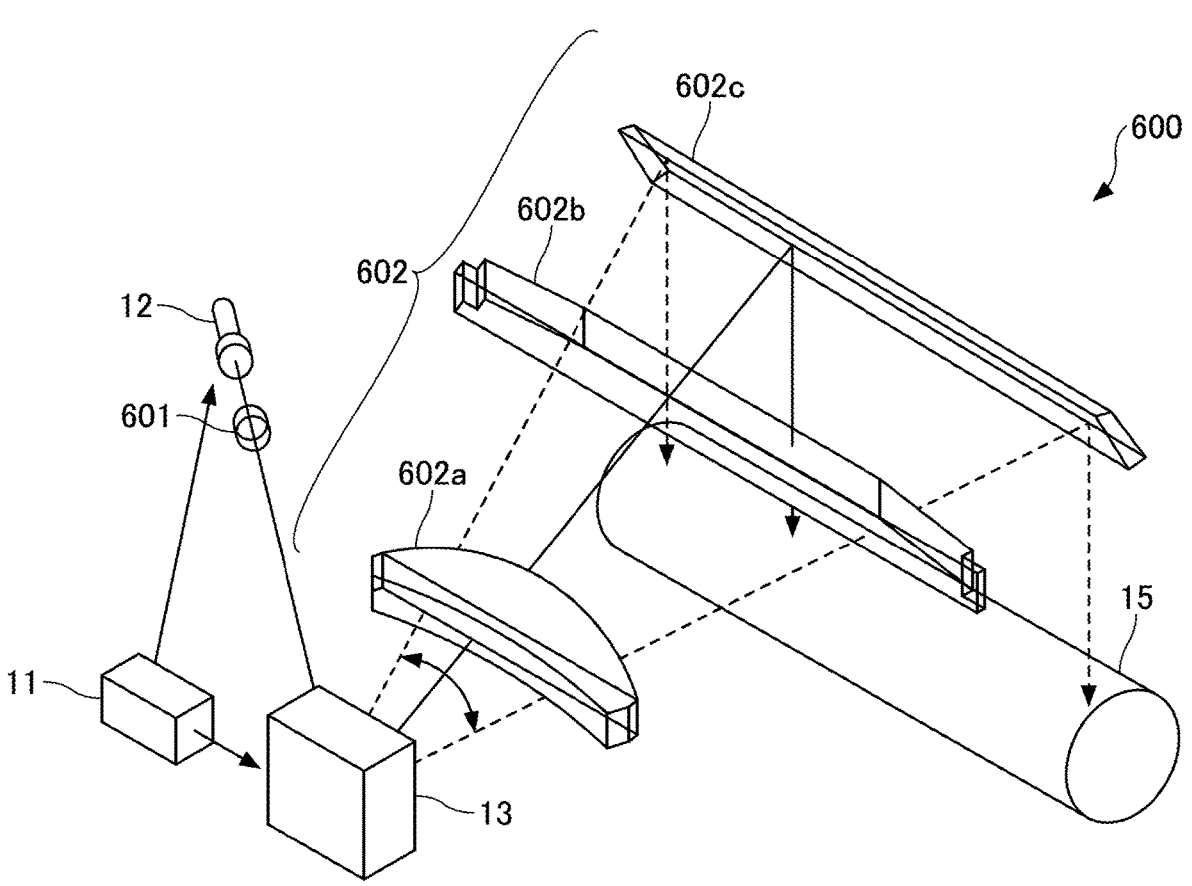
FIG. 39 is a schematic view of the optical writing apparatus in FIG. 38.

As illustrated in FIG. 39, in the optical writing apparatus 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 then passes through a scanning optical system 602 including a first lens 602a, a second lens 602b, and a reflecting mirror 602c, and is emitted onto the target surface (for example, a photoconductor drum or photosensitive paper), and thereby optical writing is performed. The scanning optical system 602 forms a laser beam in the form of a spot on the target surface 15. The light-source device 12 and the movable device 13 including the reflecting surface 14 are driven based on the control of the control device 11.

As described above, the optical writing apparatus 600 can be used as a component of the image forming apparatus having a printer function using laser beams. Moreover, by employing another scanning optical system to perform scanning in a biaxial manner in addition to the uniaxial manner, the optical writing apparatus 600 can also be used as a component of an image forming apparatus such as a laser label apparatus that deflects laser beams to perform optical scanning on thermal media and print letters by heating.

The movable device 13 including the reflecting surface 14 to be applied to the optical writing device is advantageous in saving power of the optical writing device because power consumption for driving the movable device 13 is less than that for driving a rotational polygon mirror. The movable device 13 makes a smaller wind noise when the mirror substrate oscillates compared with a rotational polygon mirror, and thus is advantageous in achieving low noise of the optical writing apparatus. The optical writing apparatus involves much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

Object Recognition Apparatus

An object recognition apparatus incorporating the movable device 13 according to an embodiment of the present disclosure is described below in detail with reference to FIGS. 40 and 41.

Figure 40:
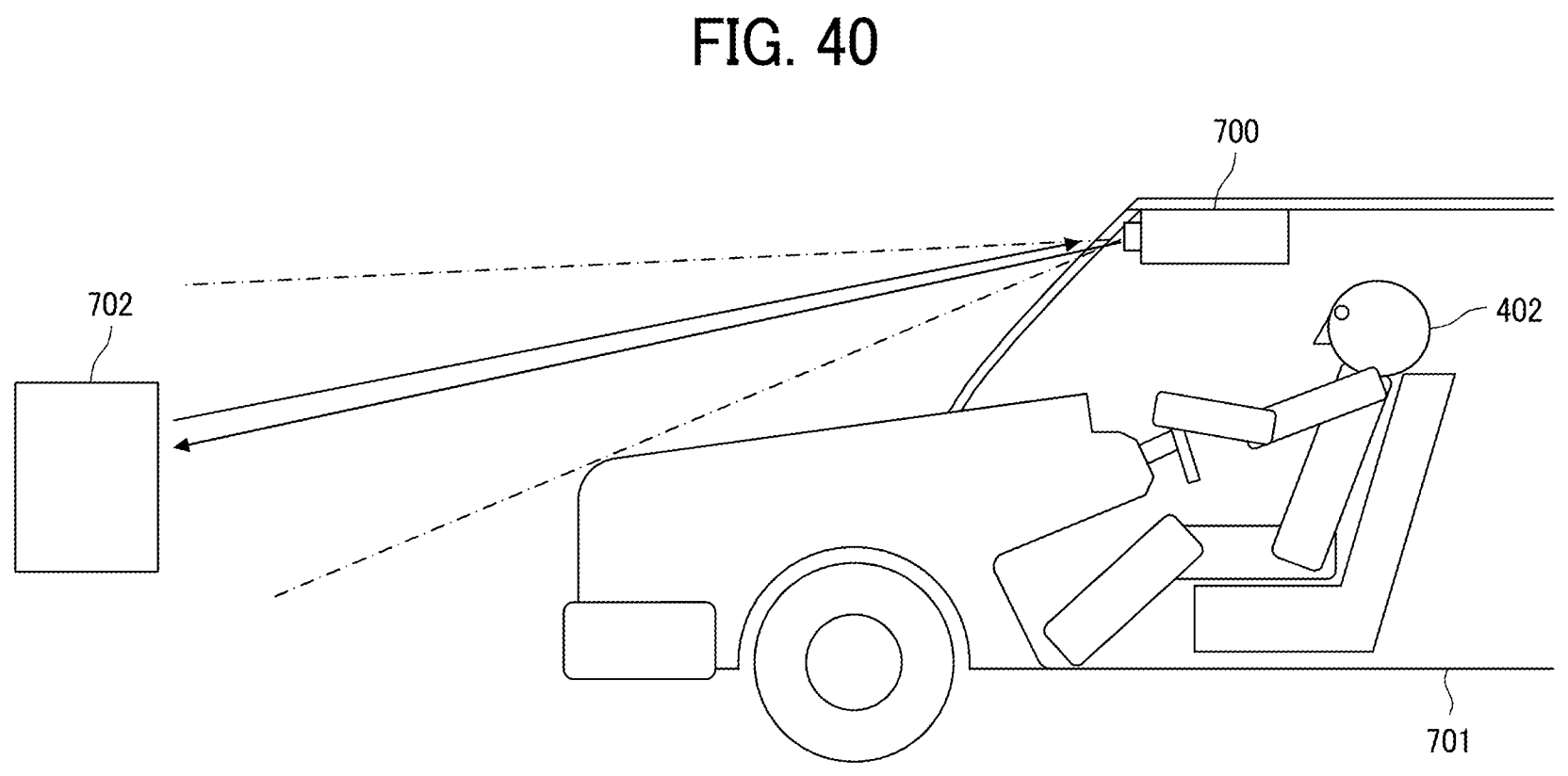

FIG. 40 is a schematic diagram of a vehicle incorporating a LiDAR device that serves as an object recognition apparatus according to an embodiment of the present disclosure. FIG. 30 is a schematic view of a vehicle mounted with a LiDAR device in a lamp unit on which a headlamp of the vehicle is mounted. FIG. 41 is a schematic view of a LiDAR device according to an embodiment of the present disclosure.

The object recognition apparatus is an apparatus that recognizes an object in a target direction, and is, for example, a LiDAR device.

As illustrated in FIG. 40, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

Figure 41:
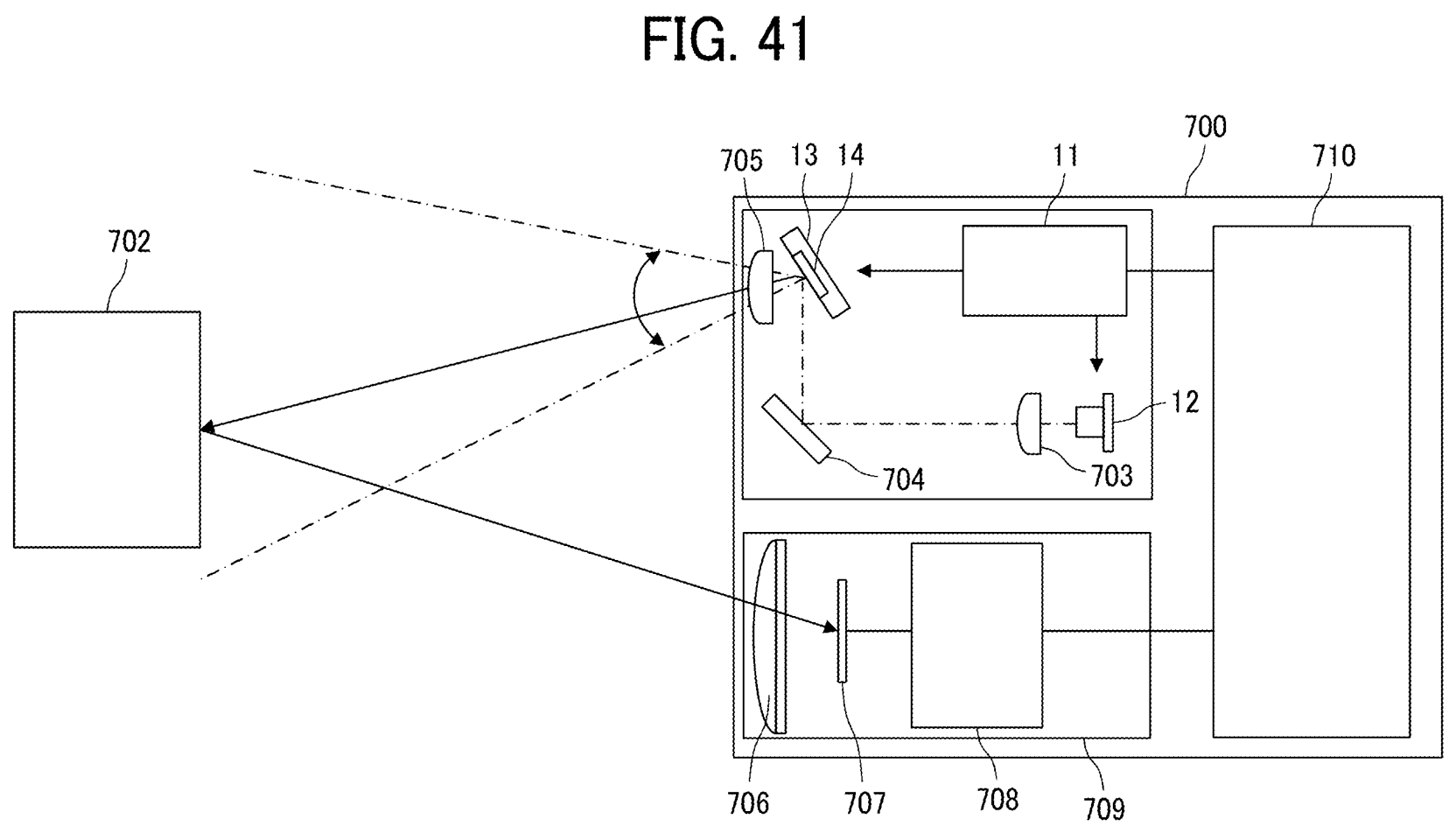

As illustrated in FIG. 41, the laser beams emitted from a light-source device 12 pass through an incidence optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projector lens 705 that serves as a projection optical system. The driving of the light-source device 12 and the movable device 13 is controlled by the control device 11. The light reflected by the object 702 is detected by a photodetector 709. In other words, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photodetector 709 receives the laser beams or the phase difference per pixel of the image sensor 707 that have received the laser beams.

Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, or a robot, and can perform optical scanning within a predetermined range to determine whether an obstacle is present or to recognize the distance to the obstacle.

In the present embodiment, the LiDAR device 700 is described as the object recognition apparatus. However, no limitation is intended thereby. The object recognition apparatus may be any apparatus that performs optical scanning by controlling the movable device 13 provided with the reflecting surface 14, using the control device 11, and that receives the receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Laser Head Lamp

Figure 42:
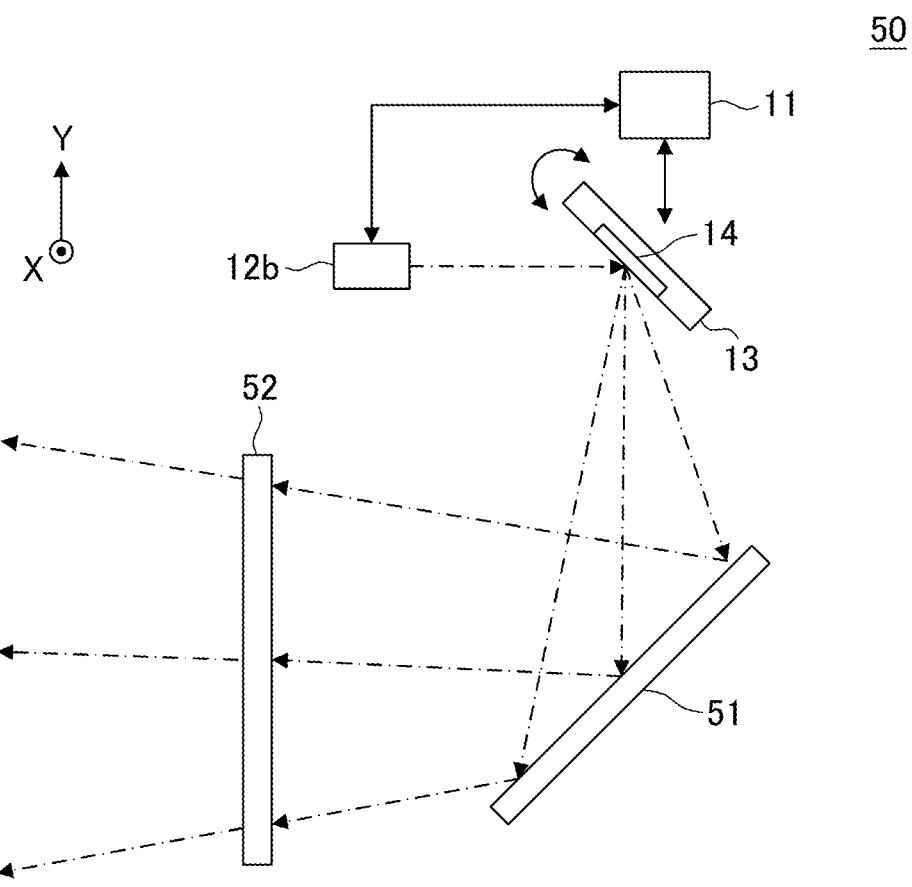
FIG. 42 is a schematic view of a laser headlamp according to an embodiment of the present disclosure.

A laser headlamp 50 incorporating the movable device according to an embodiment of the present disclosure in a headlight of a vehicle is described referring to FIG. 42. FIG. 42 is a schematic view of the laser headlamp 50 according to an embodiment of the present disclosure.

The laser headlamp 50 includes a control device 11, a light-source device 12*b*, a movable device 13 including a reflecting surface 14, a mirror 51, and a transparent plate 52.

The light-source device 12*b* is a light source that emits blue laser beams. The laser beams emitted from the light-source device 12*b* are incident on the movable device 13 and are reflected by the reflecting surface 14. The movable device 13 moves the reflecting surface 14 in the XY-direction based on the signal from the control device 11, and performs two-dimensional scanning using blue laser beams emitted from the light-source device 12*b* in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Thereby, the front of the vehicle is illuminated with white light from the transparent plate 52.

The scanning light of the movable device 13 scatters in a predetermined manner as passing through the fluorescent material of the transparent plate 52.

Accordingly, glare is attenuated at an illuminated target in the area ahead of the vehicle.

When the movable device 13 is applied to a headlight of a vehicle, the color of light beams from the light-source device 12*b* and the color of the phosphor are not limited to blue and yellow, respectively. For example, the light-source device 12*b* may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

Head-Mounted Display

A head-mounted display 60 incorporating the movable device according to an embodiment of the present disclosure is described below with reference to FIGS. 43 to 44. The HMD 60 is a head-mounted display that can be mounted on a human head, and can be shaped like, for example, glasses. In the following description, such a head-mounted display is referred to simply as an HMD.

Figure 43:
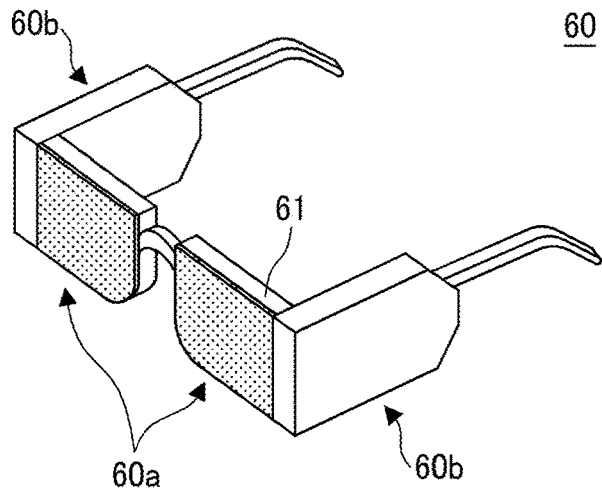
FIG. 43 is a perspective view of an HMD according to an embodiment of the present disclosure.

FIG. 43 is a perspective view of the appearance of the head-mounted display 60. In FIG. 43, the HMD 60 includes a pair of a front part 60*a* and a temple 60*b* provided substantially symmetrically on each of the left and right. The front parts 60*a* each have a light guide plate 61. An optical system, a controller, and another component are incorporated in the temple 60*b*.

Figure 44:
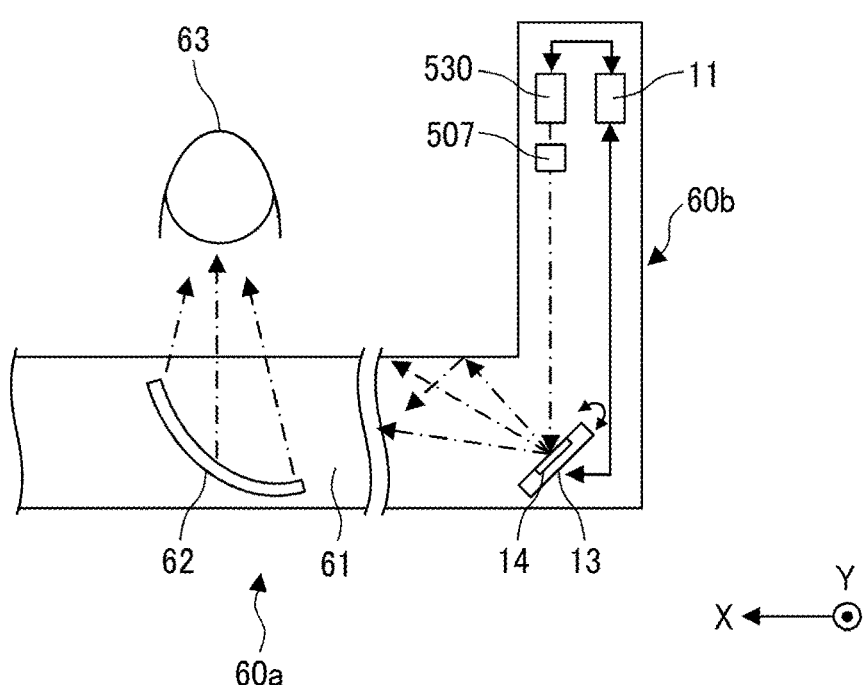
FIG. 44 is an illustration of the HMD according to an embodiment of the present disclosure.

FIG. 44 is an illustration of a part of the head-mounted display 60. Although the configuration for the left eye is illustrated in FIG. 44, the head-mounted display 60 has a configuration similar to that for the right eye.

The HMD 60 includes a control device 11, a light source unit 530, a light-intensity adjuster 507, a movable device 13 including a reflecting surface 14, a light guide plate 61, and a semi-reflective mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507, and then the light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 reflects the scanning light on the inner wall and guides the scanning light to the semi-reflective mirror 62. The light guide plate 61 is formed by, for example, resin that has transparency to the wavelength of the scanning light.

The semi-reflective mirror 62 reflects the light that is guided through the light guide plate 61 to the rear side of the HMD 60, and the reflected light exits towards an eye of a wearer 63 of the HMD 60. The semi-reflective mirror 62 has, for example, a free-form surface shape. An image formed of the scanning light is reflected by the semi-reflective mirror 62, thus being formed on the retina of wearer 63. Alternatively, the reflection at the semi-reflective mirror 62 and the effect of the crystalline lenses of eyeballs causes the image of the scanning light to be formed on the retina of the wearer 63. Moreover, due to the reflection at the semi-reflective mirror 62, the spatial distortion of the image is corrected. The wearer 63 can observe an image formed by the light of scanning in the XY direction.

The wearer 63 observes an image of external light superposed on the image of the scanning light because of the semi-reflective mirror 62. The semi-reflective mirror 62 may be replaced with a mirror to exclude the extraneous light. In such a configuration, only the image that is formed by scanning light can be observed.

The embodiments described above are given by way of example, and unique advantageous effects are achieved for each of the following aspects given below.

Aspect 1

A movable device 13 includes a movable portion 101, a member (e.g., a first member 110a) connected to the movable portion 101, and a supporting portion 120 connected to the member (e.g., the first member 110a). The member (e.g., the first member 110a) includes a drive unit 112a ((e.g., the first drive unit 112a) to move the movable portion 101. The movable portion 101 oscillates about a first rotation axis 1 and a second rotation axis 2 intersecting with the first rotation axis 1. The member (the first member 110a) includes an opening 170. The opening includes a first opening 170 partly included in the drive unit 112a.

The first opening 170 allows the member to easily bend around or along the straight line 6 passing the center of the drive unit 112a in FIG. 6. Bending (or deformation) of the member around the straight line 6 facilitates the rotation motion of the connection portion 111a around the straight line 6. In addition, the first opening 170 allows a portion around the edge of the opening of the drive unit 112a to serve as a free end, which easily undergoes motion (i.e., displacement) in the Z-direction. In particular, portions of the drive unit, which are opposed to each other across the first opening in the vicinity of the edge of the drive unit, can be easily displaced in opposite directions, i.e., in the +Z-direction and the −Z-direction.

The portions opposed to each other across the first opening displaces in the +Z-direction and the −Z-direction. This displacement facilitates the rotational motion of the connection portion 111a connected to the support body 180a for drive unit. This rotational motion can reduce the drag force on the first member against the oscillation motion of the second driver and the fourth driver. This effect is not limited to the first member, but the same mechanism occurs in adjacent members. The drag force imposed on each driver reduces the deflection angle of the reflecting surface. The deflection angle can be increased by preventing such a reduction in the deflection angle.

Aspect 2

In the movable device according to Aspect 1, a first connection site between the movable portion and the member (e.g., the first member 110a) is different from a second connection site between the supporting portion 120 and the member (e.g., the first member 110a).

In this configuration, the second opening facilitates the displacement (e.g., a rotation) of the connection portion in the Z-direction. In particular, portions of the connection portion, which are opposed to each other across the second opening, can easily displace in the Z-direction without any mutual interference. This allows the connection portion 111a adjacent to the fourth member to easily displace (e.g., rotate) in the —Z-direction, for example, when the connection portion 111a adjacent to the second member undergoes motion (e.g., rotates) in the +Z-direction. The portions of the connection portion, which are opposed to each other across the second opening, can easily displace in the +Z-direction and the −Z-direction (i.e., the opposite directions).

This enables a reduction in the drag force against the oscillation motion of the second drive unit and the fourth drive unit. The reduction in the drag force enables a higher deflection angle of the reflecting surface.

Aspect 3

In the movable device 13 according to Aspect 1 or 2, the member (e.g., the first member 110a) further includes a connection portion 111a connected to the movable portion 101. The opening includes a second opening 171 formed in the connection portion 111a.

This configuration allows the drag reduction due to the rotational motion of the connection portion caused by the first opening described above to be interlinked with the drag reduction due to the opposite translational motion of the connecting portion caused by the second opening. Thus, a further drag reduction is obtained. The reduction in the drag force enables a higher deflection angle of the reflecting surface.

Aspect 4

In the movable device according to any one of Aspect 1 to Aspect 3, the first opening 170 and the second opening 171 are continuous with each other.

The reduction in the drag force enables a higher deflection angle of the reflecting surface.

Aspect 5

In the movable device according to any one of Aspect 1 to Aspect 3, the supporting portion 120 includes a third opening 172.

This enhances its effects by increasing the length of the first opening in the extension direction. However, the size of the drive units has a finite constraint. Increasing the length of the first opening enhances the flexibility of the connection portions, reducing the drag force. In order to extend the first opening, the third opening is also formed in the supporting portion 120. As a result, the opening becomes longer in the extending direction, and the deflection angle can be further increased.

Aspect 6

In the movable device according to any one of Aspect 1 to Aspect 5, the first opening 170 and the third opening 172 are continuous with each other.

This allows the end of the first opening and the third opening to be positioned within the support portion. At the end of the third opening, torsional displacement occurs in the silicon active layer 163 due to displacement of the portion around the opening, generating shear stress.

In the region subjected to the large shear stress, mechanical damage is likely to occur. The supporting portion 120 has a high strength by increased by the silicon support layer 161. Positioning the end of the third opening at the position with high mechanical strength reduces or prevents failure due to stress-induced breakage.

Aspect 7

In the movable device according to any one of Aspect 1 to Aspect 6, the second opening 171 and the first opening 170 are continuous from a boundary between the movable portion 101 and the connection portion 111a to a boundary between the drive unit (e.g., the first drive unit 112a) and the member (e.g., the first member 110a).

This allows the second opening 171 and the first opening 170 to be continuous from the boundary between the movable portion and the connection portion to the boundary between the drive unit and the member (e.g., the first member 110*a*) are formed continuously from the boundary between the movable portion and the connection portion to the boundary between the drive unit and the member. The first opening being continuous with the second opening allows an opening are connected to each other to form an opening extended to its maximum extent. Longer opening enables a higher deflection angle. The reduction in the drag force enables a higher deflection angle of the reflecting surface.

In addition, since the first opening is not extended to the supporting portion 120, the photolithography process and the etching process during a process of forming an opening in the silicon support layer 161 is facilitated, and the manufacturing cost is reduced.

Aspect 8

In the movable device according to any one of Aspect 1 to Aspect 7, the drive unit (e.g., the first drive unit 112*a*) has a symmetrical shape to the first opening 170 in a lateral direction (i.e., a direction orthogonal to the longitudinal direction of the first opening 170, or the connection direction described above) of the first opening 170.

This arrangement enhances the oscillation of the movable portion equally around the first axis and the second axis.

Aspect 9

In the movable device according to any one of Aspect 1 to Aspect 8, the second opening 171 divides the connection portion into two portions. The two portions are symmetrical with respect to a straight line passing through the center of the second opening along the longitudinal direction of the second opening.

This arrangement homogenizes the oscillation of the movable portion around the first axis and the second axis.

Aspect 10

In the movable device according to any one of Aspect 1 to Aspect 9, the member (e.g., the first member 110*a*) further includes multiple first openings 170 including the first opening 170. The multiple first openings 170 are arranged symmetrically with respect to a line that substantially bisects the drive unit.

This configuration with two or more openings facilitates the oscillation of the movable portion and increases the amount of oscillation of the movable portion irrespective of the mutual constraints between the oscillations in the two vector directions.

Aspect 11

In the movable device according to any one of Aspect 1 to Aspect 10, the second opening 171 is branched off (e.g., bifurcated) in the connection portion.

This enables a longer connecting portion and achieves a higher degree of oscillation amplitude.

Aspect 12

In the movable device according to any one of Aspect 1 to Aspect 11, the second opening 171 has the end aligned with the end of the movable portion 101.

This allows two connection sites connected with the movable portion and enhances the flexibility of the connecting portion, achieving a movable device that reduces or prevents mechanical damage with high reliability.

Aspect 13

In the movable device according to any one of Aspect 1 to Aspect 12, the drive unit 112*a* has a cantilever structure or a meandering structure.

This configuration enables a higher deflection angle and increases the resonance frequency of the movable portion, achieving higher disturbance resistance.

This further allows for the cancellation of mechanical vibrations occurring in opposite phases between the piezo-electric drive group A and the piezoelectric drive group B, thus preventing residual vibrations (ringing). Thus, a movable device with enhanced scanning line quality is provided.

Aspect 14

The movable device according to any one of Aspect 1 to Aspect 13, further includes four members 110*a*, 110*b*, 110*c*, and 110*d*, the four members including drive units 112*a*, 112*b*, 112*c*, and 112*d*, respectively. The drive units include the drive unit 112*a*. The drive units cause the movable portion 101 to oscillate about the first rotation axis 1 and the second rotation axis 2 in accordance with electrical signals applied to the drive units, respectively. Amplitude and phase of the electrical signals applied to the drive units are individually adjusted.

This configuration provides a movable device that enables a high angle of view in two-dimensional directions.

Aspect 15

In the movable device according to any one of Aspect 1 to Aspect 14, the movable device performs Lissajous scan, vector scan, and DC voltage drive.

This configuration provides a movable device that enables a high angle of view for Lissajous scan, vector scan, and variable direct current drive.

Aspect 16

A projection apparatus includes an optical scanning system including the movable device according to Aspect 1.

Aspect 17

A head-up display includes the movable device according to Aspect 1.

Aspect 18

A laser headlamp includes the movable device according to Aspect 1.

Aspect 19

A head-mounted display includes the movable device according to Aspect 1.

Aspect 20

An object recognition apparatus includes the movable device according to Aspect 1.

Aspect 21

A mobile object includes the head-up display according to Aspect 17, the laser headlamp according to Aspect 18, and the object recognition apparatus according to Aspect 20.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A movable device comprising:
a supporting portion;
a movable portion movable about a first rotation axis and a second rotation axis intersecting with the first rotation axis;
a member disposed between the movable portion and the supporting portion, the member being connected to the movable portion at a first position, and the member being connected to the supporting portion at a second position, the member including:

a drive unit configured to move the movable portion by expanding or contracting in response to a driving voltage applied to the drive unit; and a first opening formed in the drive unit such that the drive unit is disposed along at least a part of an outline of the first opening, the first opening having an elongated shape extending in a longitudinal direction that is a connection direction connecting the first position and the second position.

2. The movable device according to claim 1, wherein the drive unit is symmetrical with respect to the first opening in a lateral direction orthogonal to the connection direction.

3. The movable device according to claim 1, wherein the member further has a fourth opening, and the first opening and the fourth opening are symmetrical with respect to a line bisecting the drive unit in the connection direction.

4. The movable device according to claim 1, wherein the drive unit has a cantilever structure or a meandering structure.

5. The movable device according to claim 1, further comprising:

four members including the member, the four members respectively including drive units including the drive unit, wherein the drive units cause the movable portion to oscillate about the first rotation axis and the second rotation axis in accordance with electrical signals respectively applied to the drive units, and amplitude and phase of the electrical signals are individually adjustable.

6. The movable device according to claim 1, wherein the movable device performs Lissajous scan, vector scan, and variable direct current drive.

7. A projection apparatus comprising an optical scanning system including the movable device according to claim 1.

8. A head-up display comprising the movable device according to claim 1.

9. A laser headlamp comprising the movable device according to claim 1.

10. A head-mounted display comprising the movable device according to claim 1.

11. An object recognition apparatus comprising the movable device according to claim 1.

12. The movable device according to claim 1, wherein the member further includes a connection portion having a second opening in the connection portion.

13. The movable device according to claim 12, wherein the connection portion has:

a first portion; and a second portion separated from the first portion by the second opening, and the first portion and the second portion are symmetrical with respect to a line passing through a center of the second opening along the connection direction.

14. The movable device according to claim 12, wherein the second opening is bifurcated in the connection portion.

15. The movable device according to claim 12, wherein the first opening and the second opening are connected in the connection direction.

16. The movable device according to claim 15, wherein the supporting portion has a third opening.

17. The movable device according to claim 16, wherein the first opening and the third opening are connected in the connection direction.

18. The movable device according to claim 15, wherein the second opening extends from a boundary between the movable portion and the connection portion toward the drive unit.

19. The movable device according to claim 18, wherein the second opening has an end aligned with the boundary between the movable portion and the connection portion.

* * * * *